US011709487B2

(12) United States Patent
Charlton

(10) Patent No.: US 11,709,487 B2
(45) Date of Patent: Jul. 25, 2023

(54) PRACTICAL GROUP PROTECTION SYSTEM

(71) Applicant: Walter T. Charlton, Woodsboro, MD (US)

(72) Inventor: Walter T. Charlton, Woodsboro, MD (US)

(*) Notice: Subject to any disclaimer, the term of this patent is extended or adjusted under 35 U.S.C. 154(b) by 0 days.

(21) Appl. No.: 17/397,662

(22) Filed: Aug. 9, 2021

(65) Prior Publication Data
US 2021/0373549 A1 Dec. 2, 2021

Related U.S. Application Data

(62) Division of application No. 16/697,172, filed on Nov. 26, 2019, now Pat. No. 11,086,312.

(60) Provisional application No. 62/771,562, filed on Nov. 26, 2018.

(51) Int. Cl.
| G05D 1/00 | (2006.01) |
| B64C 39/02 | (2023.01) |
| B64D 27/24 | (2006.01) |
| B64D 7/00 | (2006.01) |
| F41H 11/00 | (2006.01) |
| H04W 84/12 | (2009.01) |
| B64U 50/19 | (2023.01) |
| B64U 80/70 | (2023.01) |
| B64U 101/00 | (2023.01) |

(52) U.S. Cl.
CPC .......... *G05D 1/0011* (2013.01); *B64C 39/024* (2013.01); *B64D 7/00* (2013.01); *B64D 27/24* (2013.01); *F41H 11/00* (2013.01); *B64U 50/19* (2023.01); *B64U 80/70* (2023.01); *B64U 2101/00* (2023.01); *H04W 84/12* (2013.01)

(58) Field of Classification Search
CPC ................ G05D 1/0011; B64C 39/024; B64C 2201/042; B64C 2201/12; B64C 2201/201; B64D 7/00; B64D 27/24; F41H 11/00
See application file for complete search history.

(56) References Cited

U.S. PATENT DOCUMENTS

| 7,825,554 B2 | 11/2010 | Bastian, II et al. |
| 9,643,722 B1 | 5/2017 | Myslinski |
| 10,131,451 B2 | 11/2018 | Salgueiro et al. |
| 10,155,587 B1 | 12/2018 | Tang |
| 10,228,695 B2 | 3/2019 | Rezvani |

(Continued)

*Primary Examiner* — Benjamin P Lee
(74) *Attorney, Agent, or Firm* — Bridgeway IP Law Group, PLLC; Hyun Woo Shin

(57) ABSTRACT

A protection system for a classroom or other space to protect against a terrorist. The system includes a fixed control unit and a mobile control unit. The fixed control unit contains a hanger for drones to be launched against the terrorist. The fixed control unit also includes data storage units, a computer, a computer program and a memory, power storage units, a sighting laser for obtaining location information about the terrorist and an etching laser for marking the terrorist, an optics system for receiving visual information, and a telecommunication unit to send and receive information. The mobile control unit is worn by a protecting person in the space and includes some of the same components as the fixed control unit. It also has a local aiming system that includes for example a rifle type sight. The drone is a self-contained, self-propelled robotic flying vehicle that can be very small or even the size of a mouse. It has a mag-lev engine, electrical storage units and an aeronautically shaped body.

5 Claims, 16 Drawing Sheets

(56) References Cited

U.S. PATENT DOCUMENTS

| | | | |
|---|---|---|---|
| 10,259,577 | B2 | 4/2019 | Taylor et al. |
| 10,453,348 | B2 | 10/2019 | Speasl et al. |
| 10,526,094 | B2 | 1/2020 | Cheng et al. |
| 10,633,115 | B2 | 4/2020 | Pilskalns |
| 2006/0049304 | A1 | 3/2006 | Sanders |
| 2011/0272520 | A1 | 11/2011 | Ruan et al. |
| 2015/0314870 | A1 | 11/2015 | Davies |
| 2016/0266577 | A1 | 9/2016 | Kerzner |
| 2016/0364989 | A1 | 12/2016 | Speasl et al. |
| 2017/0081014 | A1 | 3/2017 | Stock |
| 2017/0144758 | A1 | 5/2017 | Myslinski |
| 2017/0203840 | A1 | 7/2017 | Myslinski |
| 2017/0203841 | A1 | 7/2017 | Myslinski |
| 2017/0225802 | A1 | 8/2017 | Lussier et al. |
| 2017/0293301 | A1 | 10/2017 | Myslinski |
| 2017/0361930 | A1 | 12/2017 | Choi et al. |
| 2018/0039286 | A1 | 2/2018 | Tirpak et al. |
| 2018/0245365 | A1 | 8/2018 | Wankewycz |
| 2018/0245890 | A1 | 8/2018 | Allen |
| 2018/0334241 | A1 | 11/2018 | Long |
| 2019/0248507 | A1 | 8/2019 | Fox et al. |
| 2020/0108922 | A1 | 4/2020 | Smith et al. |
| 2020/0108925 | A1 | 4/2020 | Smith et al. |
| 2020/0108926 | A1 | 4/2020 | Smith et al. |
| 2020/0130834 | A1 | 4/2020 | Nord et al. |

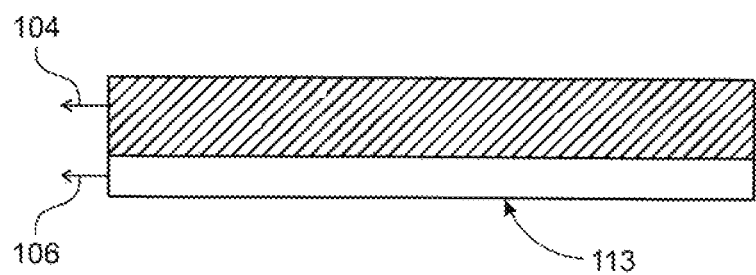
FIG. 17
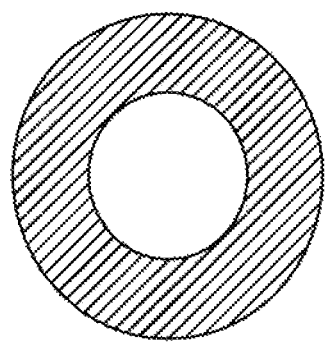 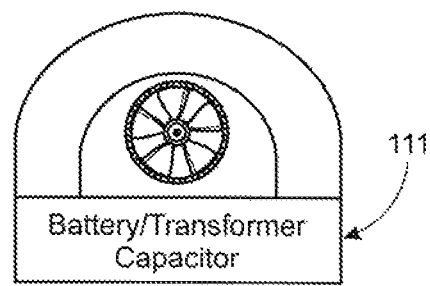
FIG. 18  FIG. 19

US 11,709,487 B2

PRACTICAL GROUP PROTECTION SYSTEM

CROSS-REFERENCE TO RELATED APPLICATIONS

The instant application is a divisional application of the U.S. Ser. No. 16/697,172 filed on Nov. 26, 2019, which claims benefit of provision application No. 62/771,562 filed on Nov. 26, 2018, the entire disclosures of which are hereby incorporated by reference.

BACKGROUND OF THE INVENTIONS

In the wake of the School Massacres, such as, the recent one in Florida, the Las Vegas Concert in Las Vegas, the bar in California on Nov. 7, 2018, theaters and churches, there is a self-evident need to utilize existing and emerging technology, now expanding the state of the art of existing systems and mechanical devices, to create solutions to the problem.

The problem of school massacres that involve guns is way out of control. Most people who desire to use guns for legal reasons rely on the Second Amendment of the US Constitution to protect their rights. The Second Amendment relates to the right of citizens to bear arms. But within large populations of good honest people it is a statistical certainty that a finite percentage of crazies exist. The proportion of lethal deviants expands as a multiple of social unrest. A saving grace is that the vast majority of the general population, adults and children alike, remain responsible law-abiding citizens.

Thus, there is the need for a protection and control system that can be easily managed yet is sophisticated enough to protect the law-abiding people within each target group.

SUMMARY OF THE INVENTIONS

An embodiment of a system according to the present inventions has the following attributes of the required system of control:

1. The system must respond very quickly to the instructions for action, within one second is preferable, with a high priority to the quicker the better;
2. The system must eliminate the possibility of wholesale collateral damage;
3. The system must operate in a panic situation in an essential foolproof manner;
4. The system must have simplicity of operation;
5. The system must be easily installed;
6. The system must be flexible and allow for systemic changes to the paradigm of control, guidance and definition, as well as real-time updates to definitions and control mechanisms within specific design parameters;
7. The system must be expansible in terms of all specifications in order to react and adopt countermeasures as the opposition adapts in its efforts to thwart the system;
8. Real-time updates in such parameters as search and destroy definitions are therefore essential such that a structure of overrides and countermeasures quickly available to systems management is also an essential part of the system structure;
9. The system must be economical to install and operate;
10. The system must be operational within one year from the date of initiation of its development; and;
11. The exact specifications and parameters should be classified as secret security matters to avoid compromise by hacking or engineering protections.

The protection system according to the present invention meets the above parameters.

In addition, the use of a drone in the protective system is described. The drone according to one embodiment comprises an independent flying device with an on-board motor, battery system, memory system and information gathering systems such as lenses and mirrors for receiving external optical images and signals.

The present invention covers a variety of components that comprise a system for protection against terrorist. Therefore, the selection and description of a particular component is for illustrative purposes is not intended to limit the scope of the invention.

The figure also depicts a room being invaded by an armed terrorist 20.

Figure 1:
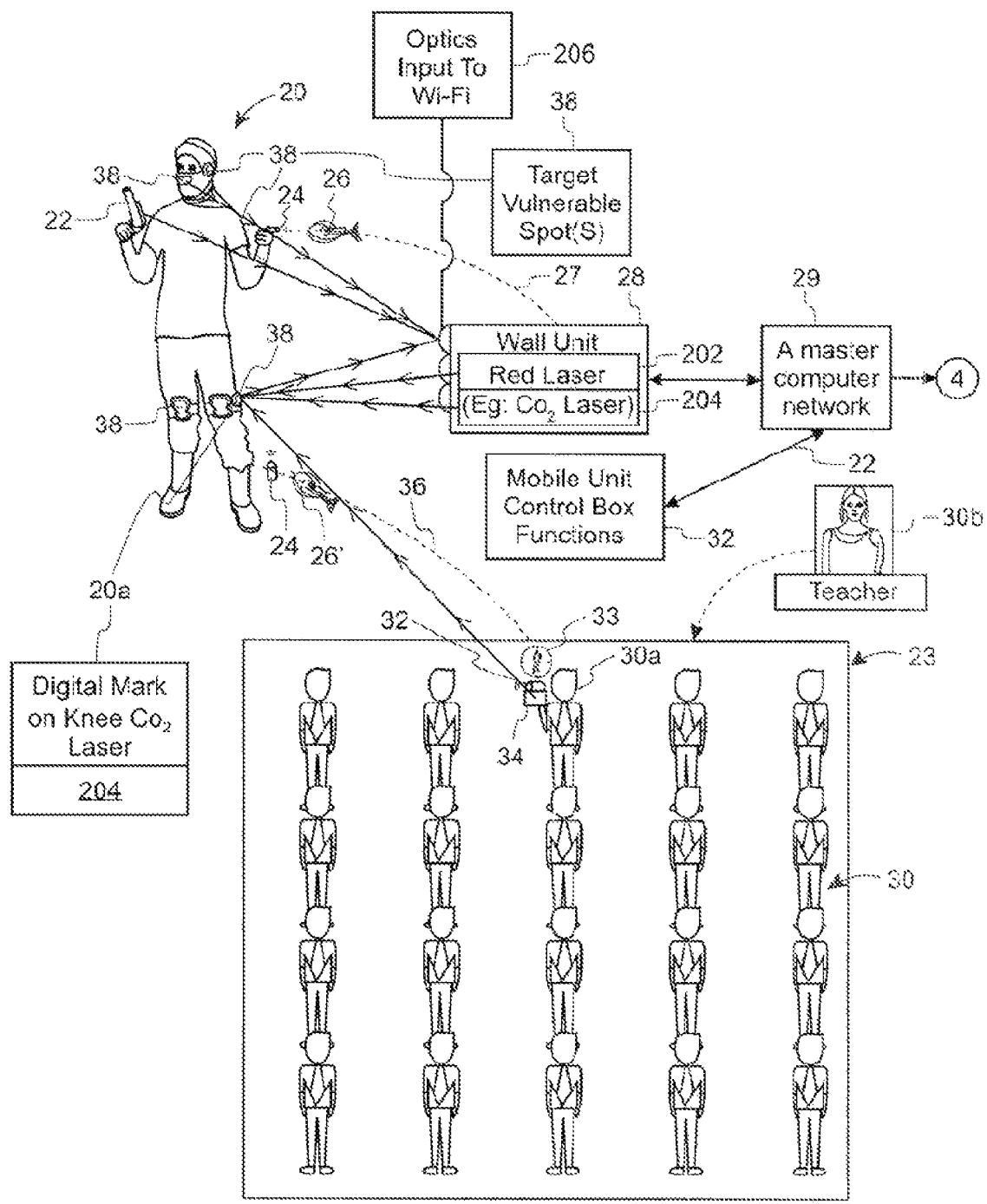
FIG. 1 is a general schematic drawing diagrammatically depicting some of the elements of the system, such as a self-sufficient wall unit 28 (containing two lasers 202, 204, and three optical input fish-eye lenses. The wall unit is interconnected to a master computer network 29. There is also a self-sufficient mobile unit operated by a student guard, and a base unit with system programs and interconnections to this local server and also to regional and national information systems through a port 4.

FIG. 1 also depicts two drones having been launched, one from the Wall Unit 28 on a trajectory 27 toward the Terrorist targeted left hand, and the second launched by the student's control box on a trajectory 36 toward the Terrorist's vulnerable left knee 38. The Harpoons carried by the Drones in flight 24 are in the process of a Kamikaze dive on a collision trajectory at the two vulnerable spots 38.

Figure 2:
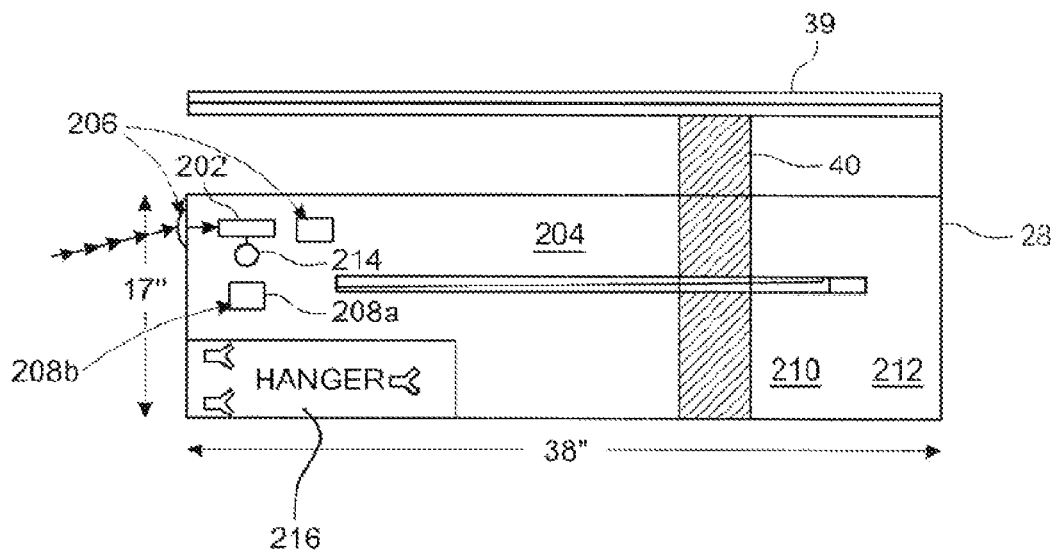
Figure 3:
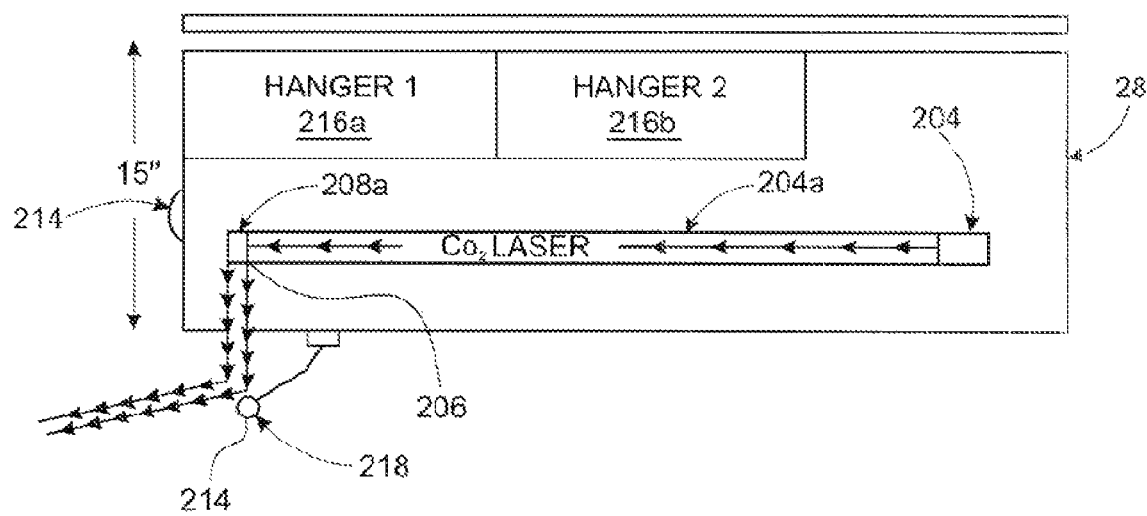
Figure 4:
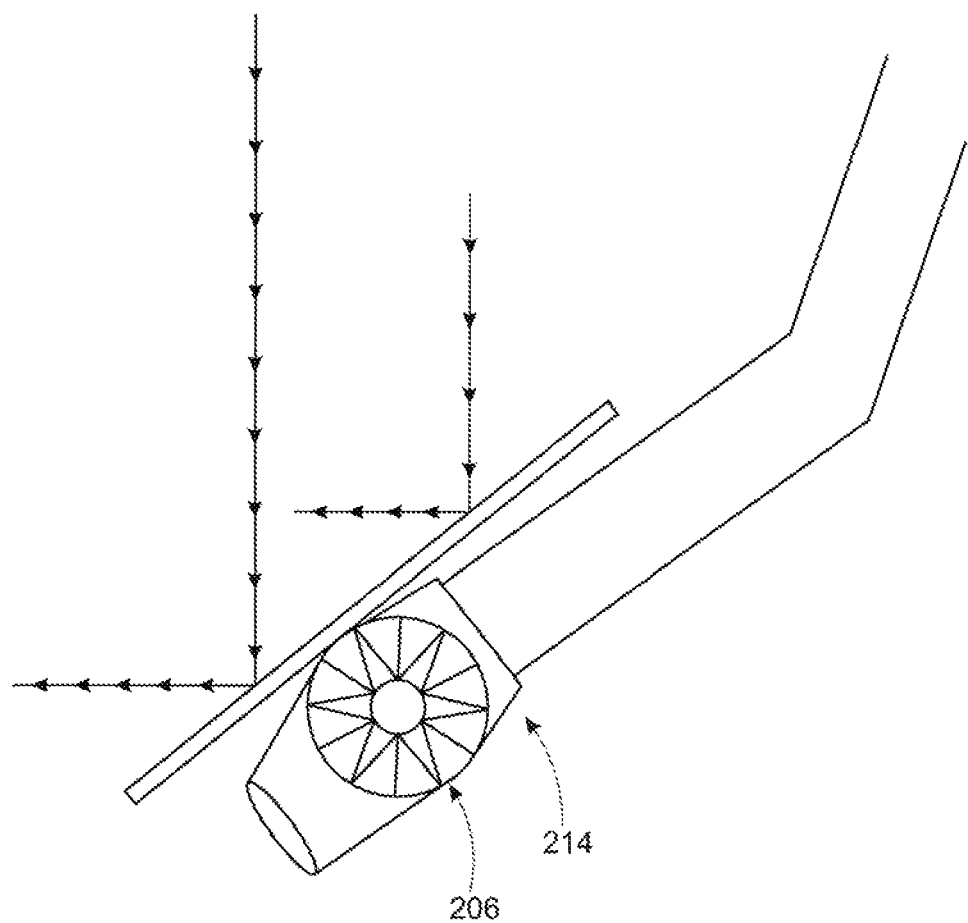
Figure 5:
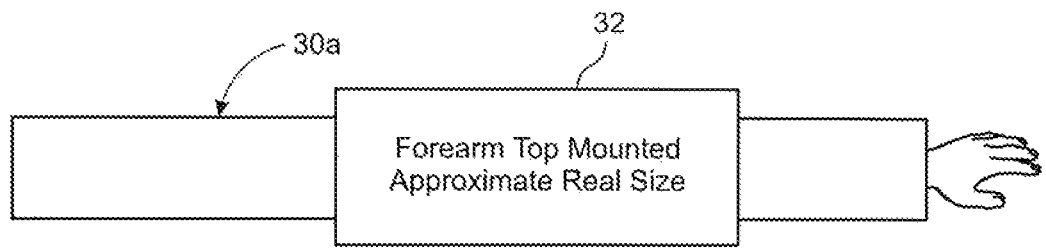

Also, power circuit and means for maintenance of a drone's capacitor power are shown. A battery/capacitor powered device which contains an internal capacitor high energy charge retention within each the base unit, and is internally stored on board to power each drone;

FIG. 2 is a schematic side elevational view of a wall unit;

FIG. 3 is a schematic top plan view of the wall unit;

FIG. 4 is a schematic view of the output from optical aiming and self-guidance systems, with logic (but not scaled) applicable in each drone, wall and mobile units, sighting system;

FIG. 5 is a schematic view of an arm of a control student bearing an arm held unit.

Figure 6:
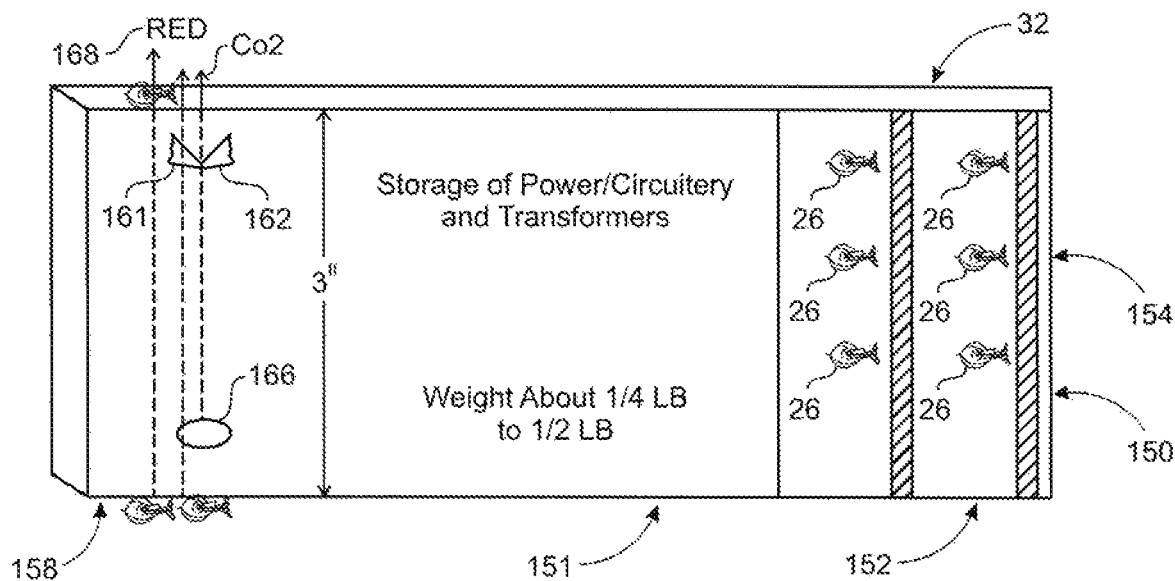
Figure 7:
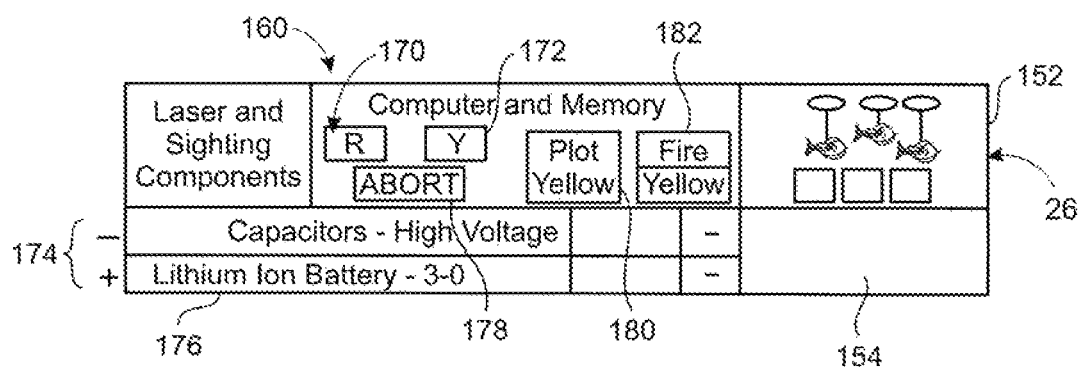

FIG. 6 is a schematic top plan view of the hand held unit;

FIG. 7 is a schematic side elevational view of the hand held unit.

Figure 8:
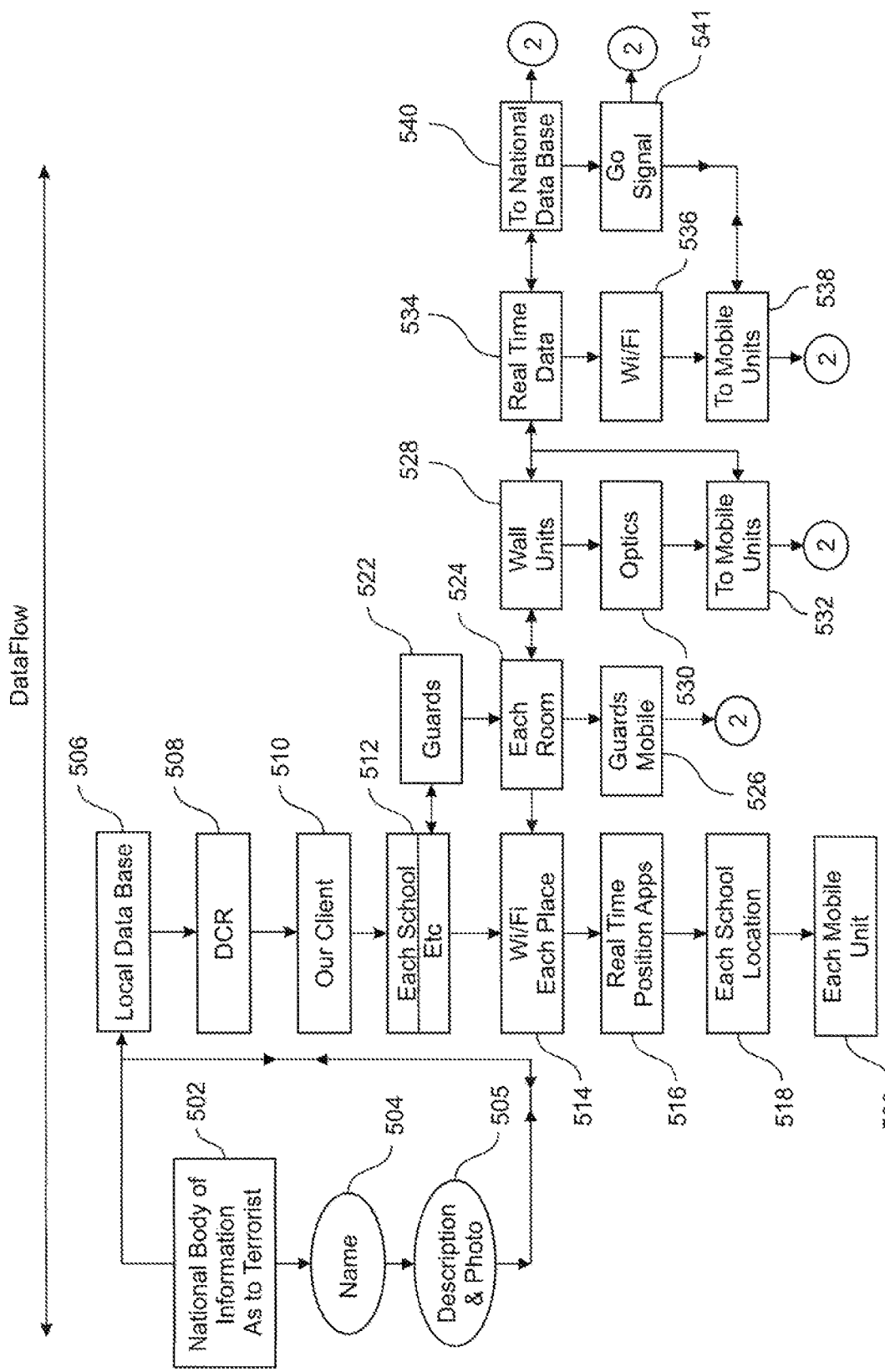

FIG. 8 is a schematic block diagram that provides an overview and methodology of the logical and physical components of the system.

Figure 9:
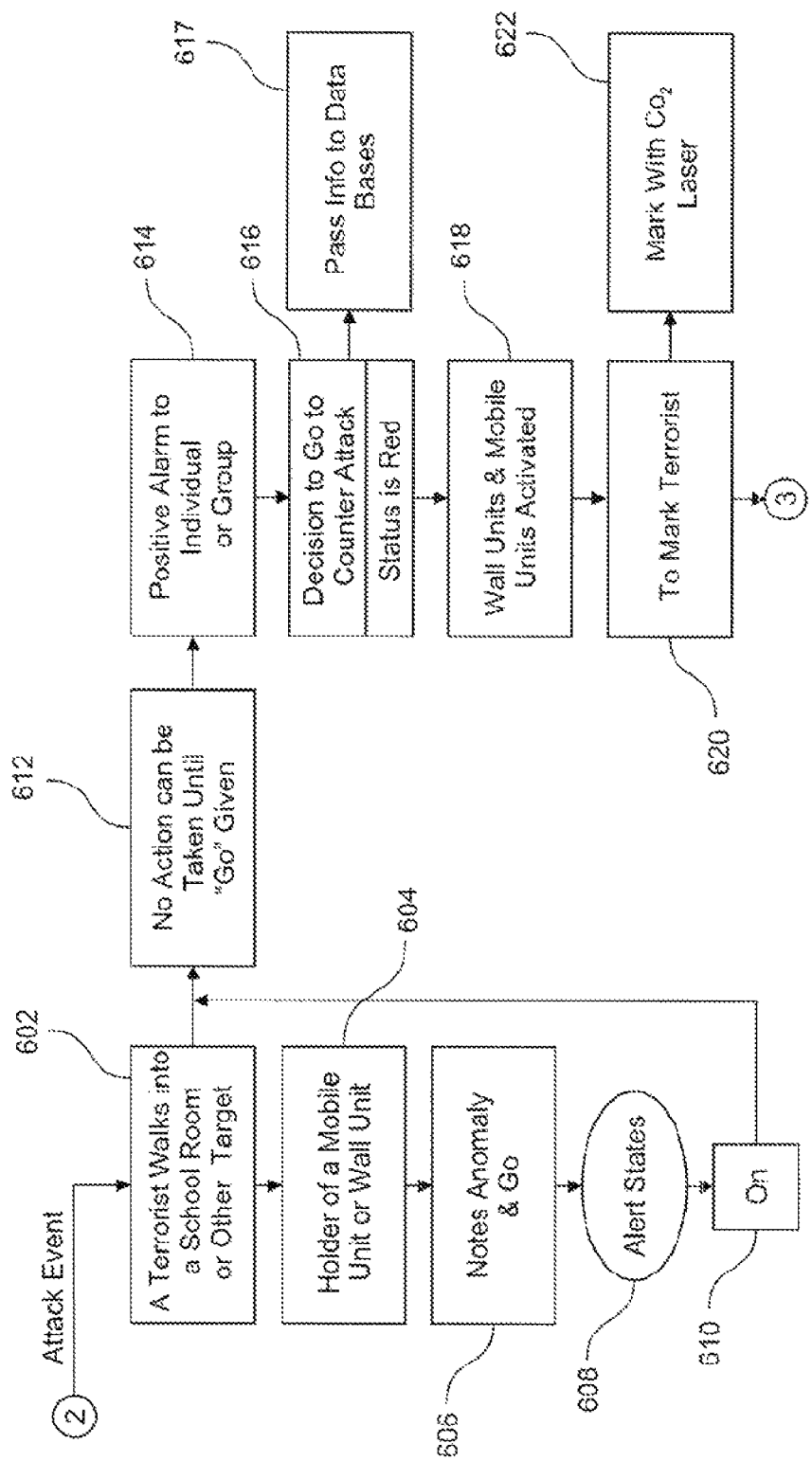

FIG. 9 is a schematic block diagram of the attack sequence and responses furnishing the protection and neutralization of the attacker. Note that no gun or fatal response is necessary nor recommended. We want these persons alive for interrogation.

Figure 10:
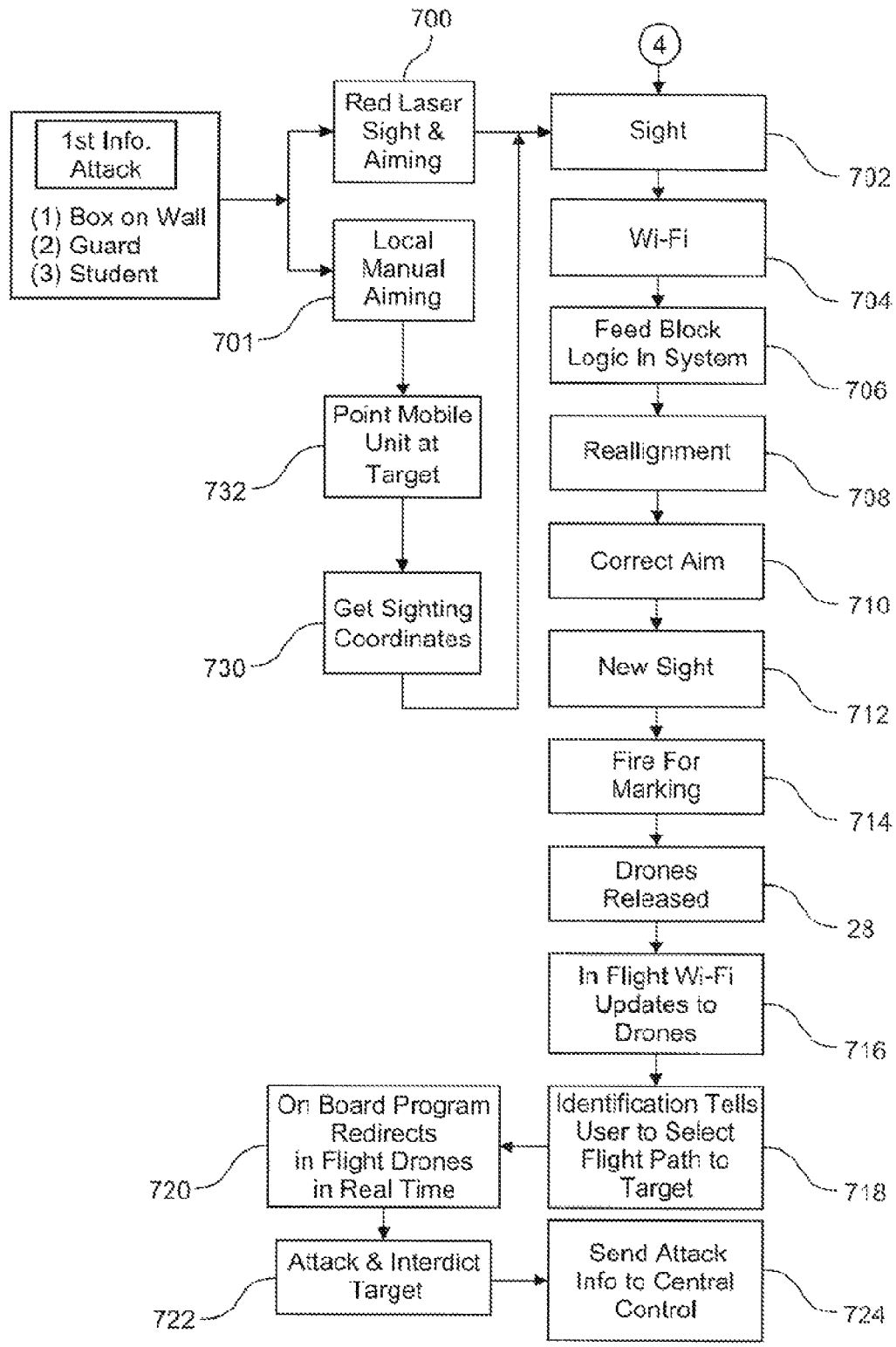

FIG. 10 is a schematic block diagram of specific actions taken with respect to the marking step of Box 622.

Figure 11:
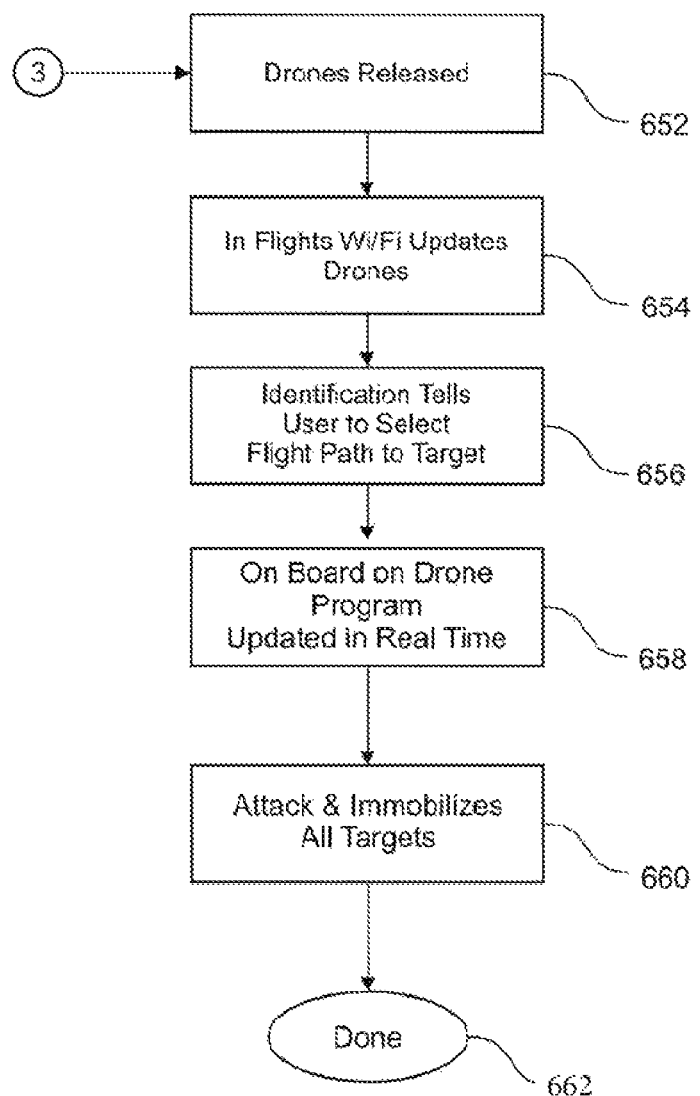

FIG. 11 is a schematic block diagram of specific actions taken after the release of the drones.

Figure 12:
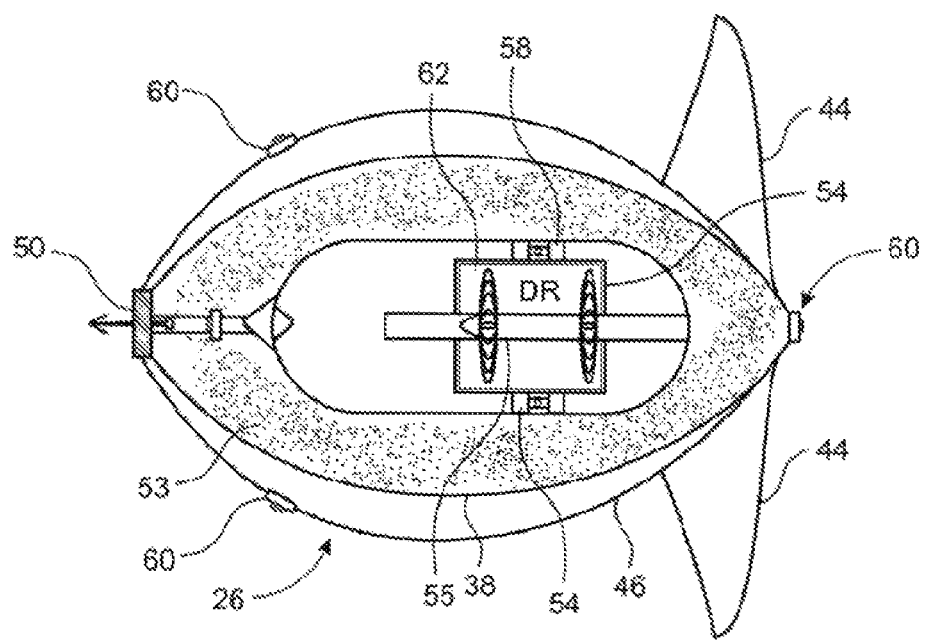

FIG. 12 is a schematic cross sectional, top plan view of a mounting mechanism for the main engine of a drone in which the main engine has a 360° directional movement and which is mounted to the airframe.

Figure 13:
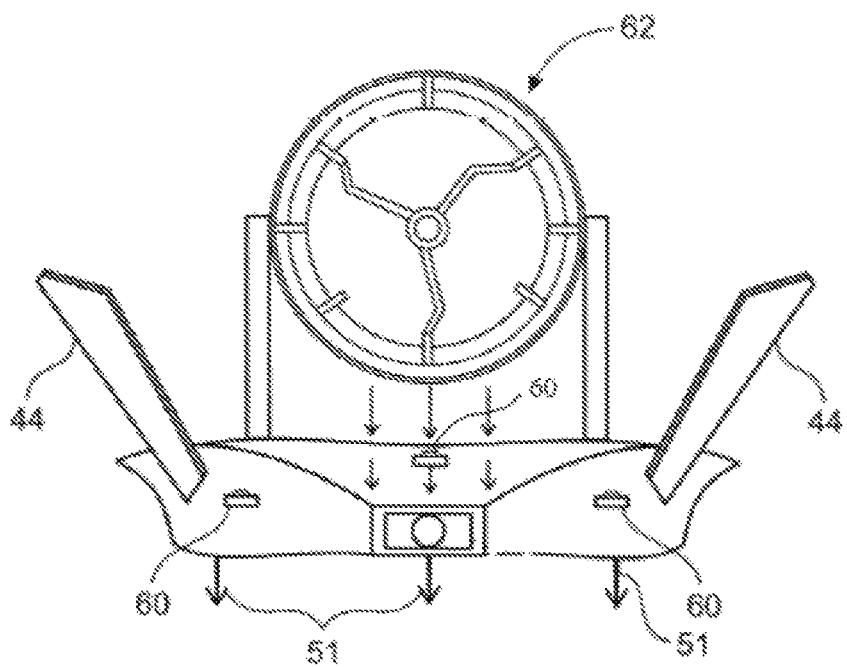

FIG. 13 is a schematic front elevation view of the drone, also showing location of optical lenses and harpoons carried by the drone located at apparently ideal locations.

Figure 14:
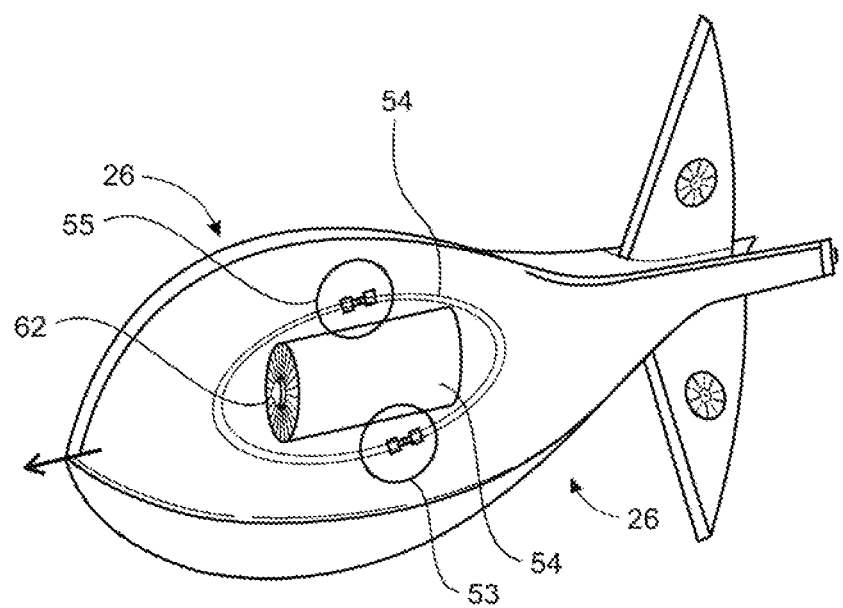

FIG. 14 is a schematic cross-sectional front elevational view of the drone.

Figure 15A:
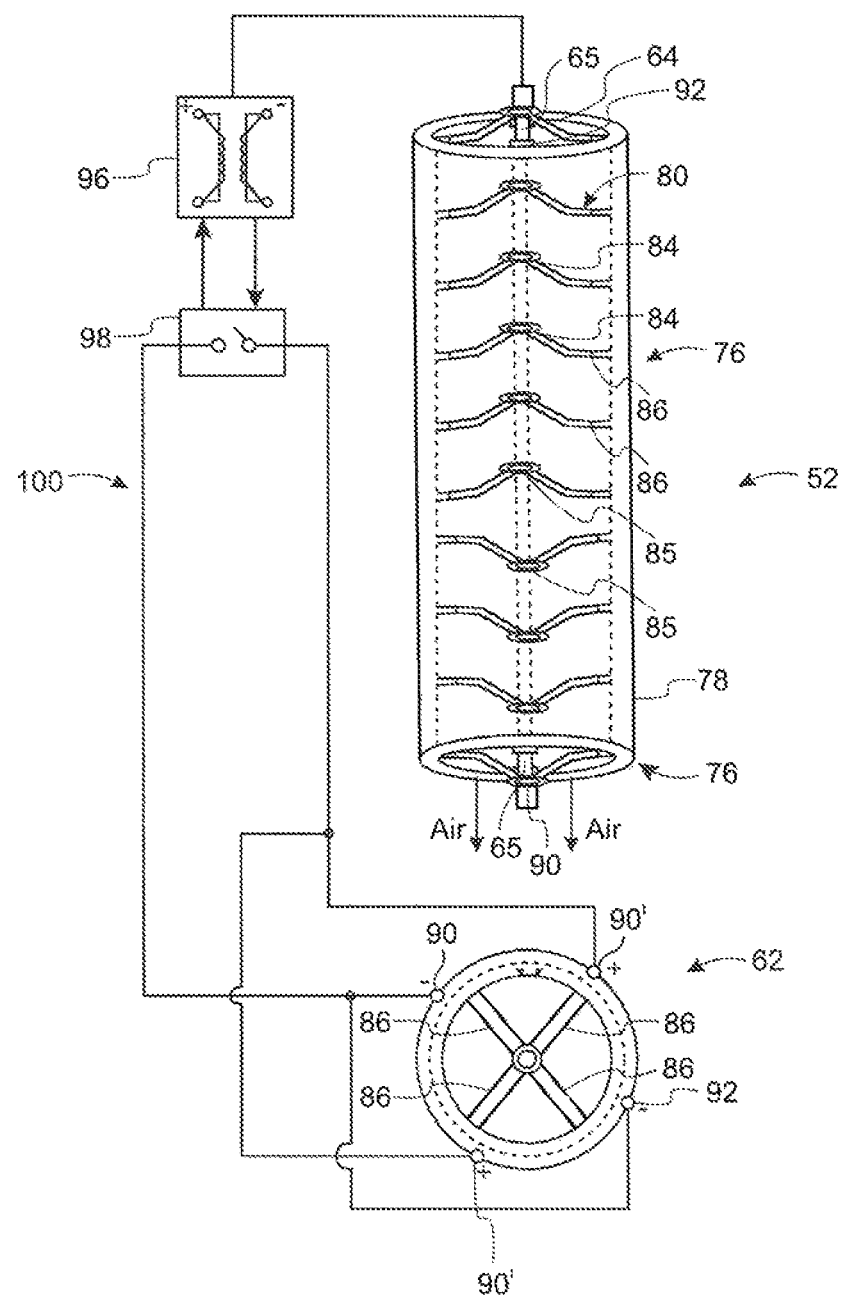

FIG. 15A is a schematic front elevational view of an electric engine capable of powering the drone. A spindle or shaft is mounted inside a housing or "can," which in turn is mounted on frictionless bearings.

Figure 15B:
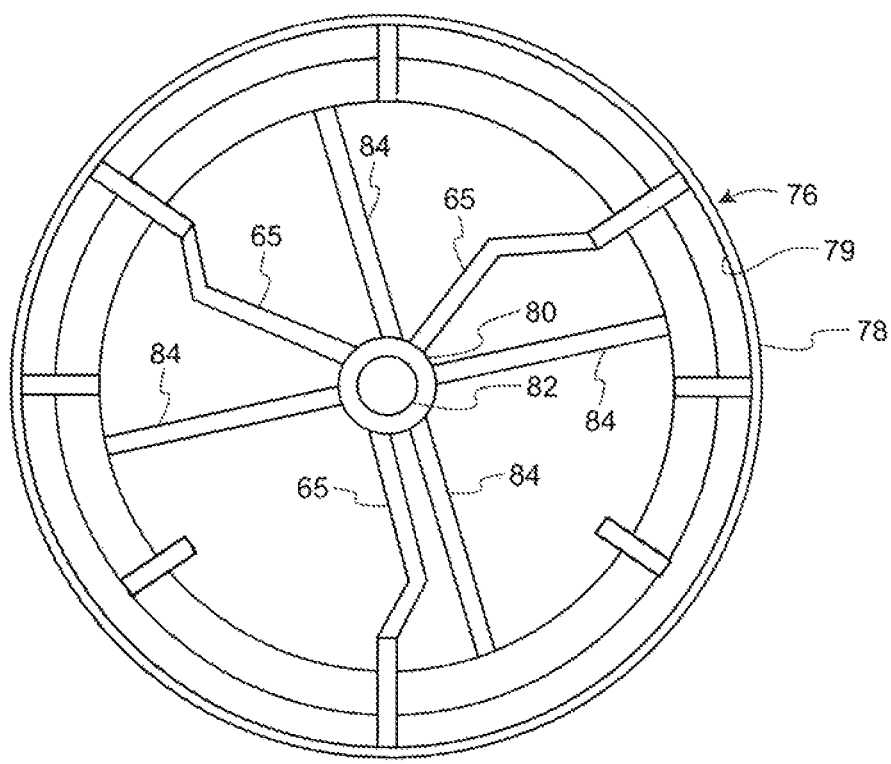

FIG. 15B is a top plan view showing the can mounting on a double gimbal

Figure 15C:
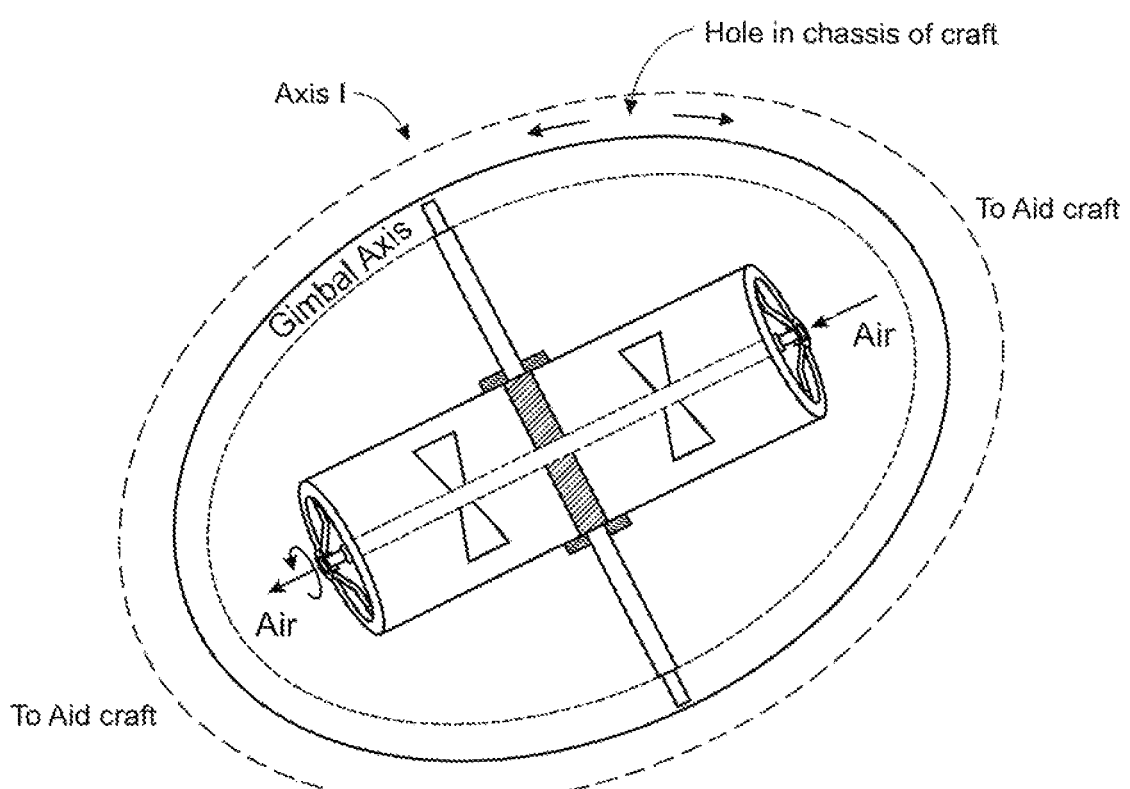

FIG. 15C is a side view showing the can mount mounting the inner spindle and gimbal.

Figure 16:
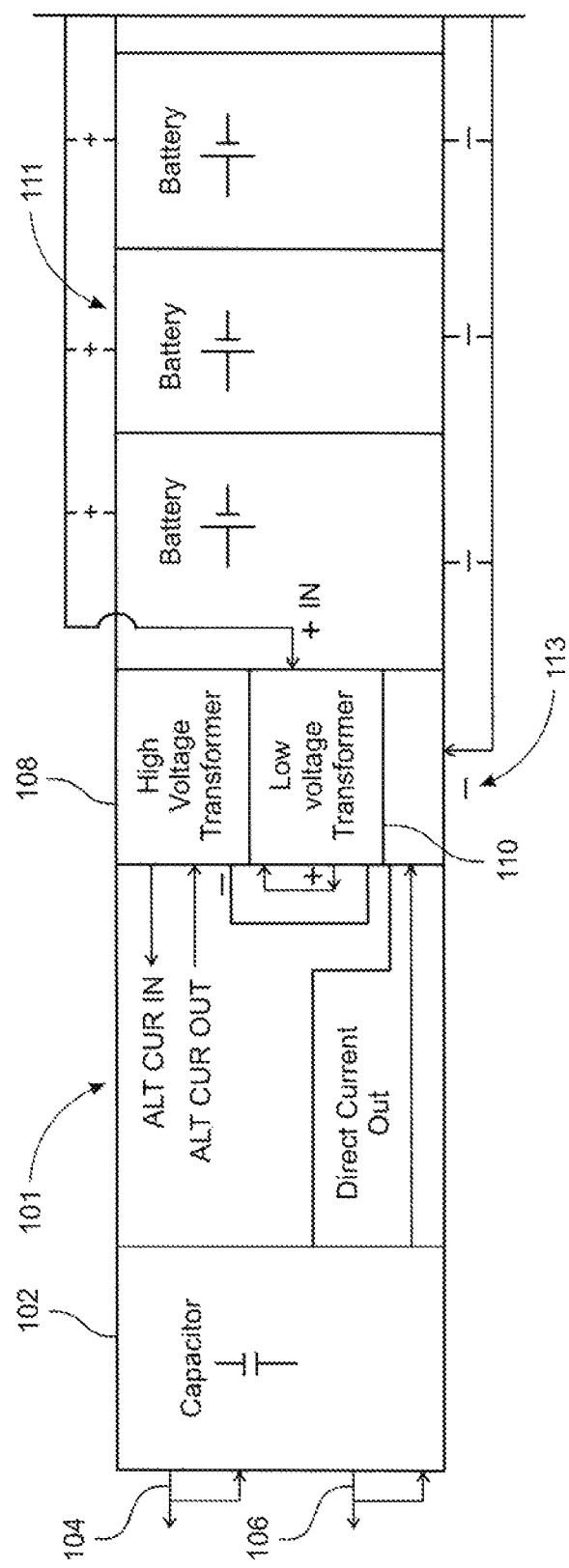

FIG. 16 is a top plan view of a chassis containing a capacitor, a battery and a transformer showing a wiring diagram of the several parts.

FIG. 17 is a side elevational view of FIG. 16.

FIG. 18 is a right elevational end view of FIG. 16.

FIG. 19 is a left elevational end view of FIG. 16.

Figure 20:
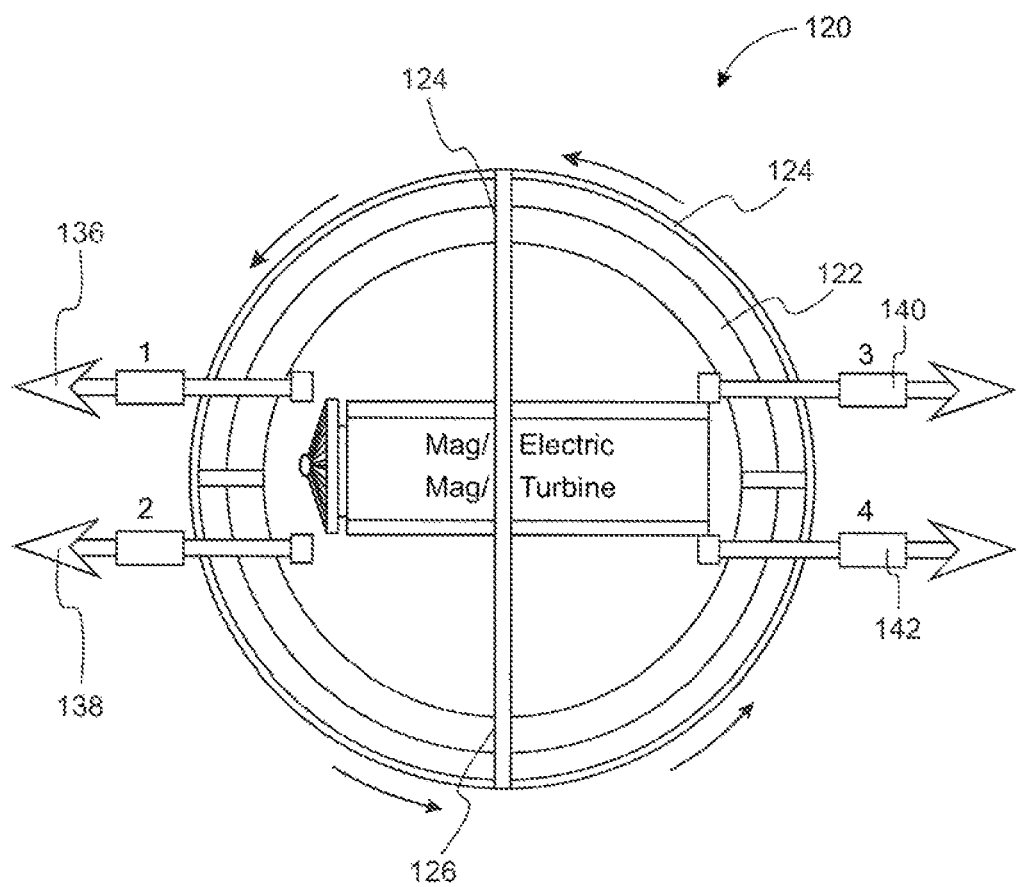

FIG. 20 is a schematic top plan view of the chassis and engine showing the locations of the fore and aft harpoons. It also shows the engine mounting in the airframe with a single rotor/turbine of a drone having capacitor storage devices that doubles as the chassis or shell of the mobile devices, furnishing strength and stability, and an expected high power to weight ratio and therefore a strong mounting base for engine and movable aerodynamic surfaces and the delivery mechanism for the injector mechanism and the payload.

Figure 21:
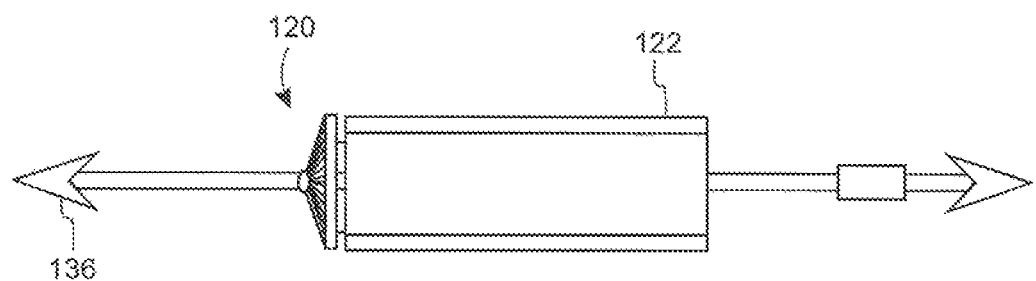

FIG. 21 is a schematic side plan view of the drone chassis and engine.

Table 1. Shows some of the available materials for high-powered capacitor use in conjunction with printed circuit batteries containing minute amounts of compounds used for doping and as lithium type batteries. All available chassis space and engine mount structural space of the disclosed drones within the load-bearing portions contain capacitive material as a secondary source of electrical power storage. The initial quick response source is capacitor storage derived from off-board power sources while docked, and on-board lithium batteries imbedded in structure while in flight for in-flight recharge of the high-powered capacitors.

TABLE I

| Material | Dielectric Constant |
| --- | --- |
| Lead Magnesium niobite (PMN) | ~20,000 |
| Modified Barium Titanite | ~10,000 |
| Barium Titanite (BT) | 4000 |
| Ta2O5 | 27 |
| Nb2O2 | 42 |
| Alumina | 10 |

Detailed Description of the Preferred Embodiments and of the Component Parts Thereof Overview Of The Overall System Identification of an Intruder, with Use of National Intelligence Systems Level 1: It is presumed that an existing national and local identification system will be in place at each user's institution location. Level 1 protection is thereby in place.

Level 2. Active Intruder.

The instant system is designed to deal with a surprise intruder. Assuming the Level 1 protection is in place and an event occurs, that event is observed at a particular time and place either by a computerized box on the wall or an individual operator (e.g. student, teacher, guard, or theater usher). The operator determines that she/he is observing an actual "live" intruder event. This decision triggers an alarm by pushing a button. Then an alarm is noted.

The mechanisms disclosed herein are used to physically and electronically "tag" the intruder. Then the incapacitation level of the system occurs under manual and/or computerized control using standard search and destroy mechanisms.

Both a wall mounted version and a mobile base unit with their own power supply contain somewhat duplicate search and immobilize components, both independent and back-up.

The system concept requires each operator to display and wear such a mobile unit or have one readily available at all times. This is necessary simply because the very nature of surprise terrorist attacks is that, up to that exact moment in time, the attack is unknown and unknowable by definition. Therefore, the response must be available at a moment's notice, upon the first indication (shot fired) for instant action. This system is designed to do that at optimum cost and minimum upset to the users. Another option, is the delivery and affixing to the target by a drone of a very small RFID (Radio Frequency Identification Device)_by a remote-controlled operator. Assuming that the RFID is not removed or falls off of the target, it can then be used as an identifier and used by the system to direct incapacitation of the target.

Each intruder would be embedded with an optically searchable symbol, such as mounted on their clothing, This searchable symbol could be as simple as a string of dots as envisioned in the original "Identi System's" (a marking device for railroad cars) or as complex as the recent pictures symbol which is essentially not possible to be forged, or other such mechanism. The actual affixing (tagging) of such a symbol to the body whether clothed or part of bare skin, is feasible and safe because the power level is adjustable, i.e., as dependent entirely upon the power level of the etching mechanism, either the wall-mounted or mobile laser etching optically controlled beam. It is important to note that the marking device is just that, not meant to incapacitate, but only to identify the target, and a specific part of the anatomy of the target if this is feasible for that particular target.

Alternatively, beginning with the premise that somewhere in a human traffic choke-point all individuals have been tagged using an armband, RFID, or other optically unique marking, the transition from an innocent individual to a targeted terrorist is quite simple. The selected individual, as identified as a terrorist by stored program information, or new information acquired by a central location merely selects the target button on his/her control pad after selecting the unique marking identifier affixed to that individual and presses Red Button-"TARGET".

In addition, a national data base containing information, including pictures, of known and suspected terrorists can be connected to the system and the pictures can be used to identify a suspected terrorist.

Under program control, the centrally located program would change the status of the individual marking mechanism as already affixed to the body of the targeted individual from benign to active terrorist. Thenceforth, all observers and all remote sensing units spaced in convenient locations or strategical locations about the facility would be on instant alert to immobilize the terrorist forthwith.

For one or more individuals who have slipped through the system, or in situations where the pre-marking is deemed unwieldy, socially unacceptable, or for example in some of the recent attacks and shootings in a Las Vegas type situation where the number of untagged individuals could be totally out of any reasonable ability to control, or in classrooms where as a matter of social acceptability tagging of students and visitors is unacceptable, one of which may be the church like locations where an alternate solution must be adopted; the mobile tagging and targeting methodology disclosed herein (as described above) appears to be the most preferable and hence viable alternative.

In this situation this system discloses two alternate and complementary methodologies for affixing a tag with a unique "intruder, #1, #2, etc. "markings". These are as follows.

a. Alternatively, a student, guard, security officer, qualified teacher or other authorized individual would activate, upon giving his/her own alarm, or by receiving a generalized notification of "intruder alert" their mobile unit, the mobile unit denoted "KAlpha", contains an optical sighting laser mechanism and a marking "etching" mechanism whereby under operator control and visual sighting (subject to computer enhancement) a vulnerable spot on the body, preferably bare skin, would be targeted and the targeting symbol affixed via near instant encoding by its onboard high-powered but short duration laser, i.e. $CO_2$ or similar type laser. Thereby, each intruder would be affixed with a symbol unique to themselves and thereby subject to attack by one or more of the fleet of drones as they are released at each of the hanger locations where in the drones were stored. For example, each such arm mounted laser sighting device could contain its own hanger, with for example 4 drones, each armed with a different deterrent payload. Although the drones in this embodiment are described as self-propelled small or miniaturized aircraft, they can also be motorized blimps or the like.

b. Or, a wall unit mounted fully automated unit containing Optics, its own lasers and controls identical to the mobile unit which could be placed at strategic locations in the protected facility. Each wall unit, as stated above, could be fully automated, or operated by remote operators using robotic controls either in parallel to mobile units, or complementary, or totally independent upon the application as most appropriate.

The energy used to power all of the circuits starts initially with the battery/capacitor storage units, and thence proceeds into the transformers, inverters and Mag/Lev engine circuits. All of these circuits and components are produced in micro size by 3-D printers and are imbedded into the structural components of the airframe and engine. Those components are therefore very light but nevertheless able to handle large loads of power. The end result is a very high power to weight ratio in a very small package.

Obviously as 3-D printing and Nano technology improve, the disclosed methodologies for tagging a dangerous target can be modified to incorporate such improvements, but they would be obvious substitutions for the above described tagging methods.

One advantage of the present delivery system methodology is that the payload is totally flexible and affixed to the mobile delivery device as a separate payload package with options from mild bee stings to incapacity via knockout drops or the equivalent, all the way to death by a variety of lethal venoms or nerve poisons. Further, given simple options under program control, an operator for example in variable options to the extent such program options have been loaded into the delivery drone, can control the marking and tagging operation.

Construction Features (1) Capacitor/Batteries/Transformers and inverters, Cams 360 degrees of view in all directions.
(2) Hanger Mountings Connections and launch controls for drones.
(3) Rotating Blades of Mag/Lev Turbo-Engine, frictionless bearings throughout,
(4) Payload & Delivery. Flexible, programmable and Micro-Miniaturized.
(5) Frictionless bearings.
(6) Double Gimbals-Allows Engine to power drone in any direction at high speed and acceleration. Computer controlled directional thrust of turbo and airframe dynamics.
(7) Easily Controlled, both remotely and on-board search and destroy.
(8) 3D Printed Ceramic Construction.
(9) Primary Capacitor Storage in Gimbals. High Power to Weight Ratio.
(10) On board flight computer, connected in real time to defense net, local and national.
(11) Optical and R/F input ports with a view in all directions. This incoming in-flight data enables, in conjunction with self-guidance data stored on board and in the remote units all linked together with conventional guidance software to allow not only self-guidance in flight of each drone, but attack with its stingers and a variable payload as combat type interactive conditions dictate.

Components

1. Device #1, The Device lens location and identifier programmable control box and an encryption projector, and storage hanger for programmable drones.
 a. A laser beam (for example red) used to detail or finely aim the laser to the exact spot of the targeted individual, for example an ear.
 b. Human controlled optics;
2. IDENTIFIER. A control box, suitable in size for desktop or portable use is provided. For example, a control box in one embodiment is strapped to the forearm of each one or more control persons or operators (e.g. students). There is at least one operator in each room as well as a control box being available for instant use by each teacher. The control box also contains a power supply. The power supply is comprised of a battery/capacitor powered system which contains an internal capacitor capable of a medium-time charge retention power.
3. Single use Micro-Drones, electrical power.
 a. Override controls and
4. Injector Mechanism for harpoons magnetic impulse driven.
 a. Automatic controls.
5. Internal Drone Program(s).
6. Power and power storage systems and devices.
7. Parameters and specs for Internal Master Control, electronic systems programs and apps, instructions for use by each operator of a mobile unit and supervisor, as for example each teacher or security officer in a protected institution.
8. Parameters and specs for Internal remote control and use by each operator.

Biological agents are generally considered too slow for the immediate incapacitation required by the circumstance.
9. Power Storage Devic(es), small and very light weight.

A $CO_2$ laser beam is folded into a matchbox sized container. Because research and experiments have demonstrated that the robustness, accuracy and focus is enhanced by a longer propagation chamber, Fresnel lenses are used to bounce the beam from side to side in the aiming box, tunable by minute adjustments in the angles of the sides, with a final 45-degree Fresnel lens for the outgoing mature focused beam which has been aimed by the guardian custodian of the unit.

A presently preferred option is a mobile tagging mechanism by etching a unique identifier symbol or number by a $CO_2$ laser. A wall mounted "tagging device," compliments its mobile counterpart, furnishing flexibility in the identification as well as the delivery process. In regard to the mobile unit each operator's mobile strap-on unit includes a high-powered but tiny and very short duration $CO_2$ laser or other marking device. Regardless of where in the physical system each component resides, a total redundancy of the identification and marking system is contemplated as contained in the Wall Mounted identification and marking unit as well as in multiple mobile units. The main functions are (1) to allow marking for identification each intruder at the earliest moment possible during the assault event.

A totally different option could be employed, as yet a third alternative utilizing RIFD devices affixed to the intruder's person, either at the door of a confined room upon entry as a requirement for entry, or as an alternative payload for the drones which are an integral part of the payload delivery system as contemplated in the laser-based identification system.

After identification and marking, the system as designed causes the launch of the drones to deliver one or more of the selected payloads to the individual or group, thus labeled as intruders and thereby subject to retribution by the system.

After launch of the drones, each drone would use its prescribed search and destroy algorithm as dictated by this particular mission. Such algorithms are presently used in standard military missile affirmative target acquisition. The attack drone would then make a bee-line to its exact target, enabling delivery even while that target is presumed to be on the move to avoid such attack.

Contained in both the mobile box, and the wall mounted unit system and necessary to enable the operation are computerized radio frequency controls, optics for laser tracking and also marking and sighting. Also contained are power supplies, a computer and a hanger for three or more insect sized attack drones. Note that the attack phase of this guardian system is either or both remote operated and controlled by a highly trained R/C control operator; and/or an on-board stored search and destroy programming. No specialized R/C skills are envisioned at each school or location. Each protected location needs only provide the identification and the payload is delivered upon the intruder. This furnishes an obvious cost/effectiveness advantage for results (incapacity of the invader).

Included with the control device, either inside it or closely associated with it, are some flying drones. Each drone is powered with its own stored electrical charge contained in a capacitor storing a very powerful charge, powered by the on-board capacitor and a large capacity but virtually weightless back-up battery. The capacity to weight ratio of the battery would be greatly enhanced by using the chassis of the drone as both a battery and a capacitor in separate compartments. The chassis would be segmented to contain both the back-up battery, the capacitor and the structure/framework, all contained in the drone chassis. In a preferred embodiment the drone power supply is stored in a thin-film circular chassis containing sufficient power to energize the drone for one flight.

Alternatively, the velocity of the drone, and an additional boost from a hydraulic or mag/lev powered needle would penetrate the skin, and/or protective suit worn by the "invader-target" who had been previously marked as the invader by phase I of the launch procedure.

Each participating member of the security system within an institution, for example one student per classroom or a teacher in the classroom, is equipped with a portable unit, described hereinbelow. Also, a computerized wall unit is used and contains optical scanning and radio transmission capabilities and an automated delivery system for both marking and attacking a terrorist source. Parameters embedded by computer controls into the system are used and have the initial assigned task within the system parameters of "marking" (tagging) the terrorist with a computer recognizable unique mark.

Although each classroom 23 (FIG. 1) has a functional independent unit in the sense that although overall system control can be exercised with lockouts based on specific information, several semi-independent wall units are located in each strategic location necessary within a school campus or auditorium facility with a view toward a complete coverage of a particular location.

Options, with Appropriate Action.

(1) Payload-Options

Possible pay-loads include a mild drug with a knock-out punch of about 6 minutes. This provides time to secure the invader or, if ultimately successful, 10 such doses would be provided with 10 drones and possibly knock the target/invader out for an hour. Alternatively, if the invader has bare skin, or body armor is being used, a small cloud of gas performing the same function could be produced. In an appropriate case, teachers could be authorized to administer a stronger dose, as deemed necessary to be ultimately effective, such as Potassium niobite (KN).

Step 1. The terrorist neutralization system is placed in a "ready" status. This status automatically accesses national, state, and local public information as to recent events which would be relevant to any determination that a terrorist is on site and that the subsequent steps for neutralization and it into the system is reasonable under the circumstances.

Step 2. The system being a ready state is now invoked either automatically by the wall-mounted system or manually by each "Guardian," such as a control student 30 (FIG. 1). The Guardian (G) has observed an overt act (i.e. the target as walked into an auditorium and pulled a gun). This observation is recorded by optical recorder within the defense unit and a snap-shot conveyed by pushing an "identification positive" button on G's mobile siding and marking unit strapped to his wrist.

Step 3. The wall unit sights use manual sights enhanced by an optical laser mechanism. Its exact target is preferably bare skin of the purported (and verified by system defined cross checks) as an intruder/terrorist. The completion of step two is signaled by the "firing" of an engraving ($CO_2$) laser beam optically designed to embed into each such target to be marked a unique identification mark. Such marking, used in all subsequent actions is burnt in microscopic size into the bare-skin (or the uniform) at or near a vulnerable spot in the terrorist anatomy, i.e. nose, ear, wrist, forehead, or ankle.

DESCRIPTION OF PREFERRED EMBODIMENTS

Reference now is made to the drawings wherein like elements are designated by like numerals throughout the several views. Aside from the preferred embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. Any claims based on the disclosures in this provisional patent application are not to be limited to that embodiment. Moreover, any such claims are not to be read restrictively unless there is clear and convincing evidence manifesting a certain exclusion, restriction, or disclaimer.

With general initial reference to FIG. 1, a general schematic drawing is depicted in which some of the elements of the System of the present invention are diagrammatically, graphically shown in a classroom setting. For example, a classroom 23 has a number of students collectively shown at 30 attending a class and being monitored by a teacher 30*b*. Within classroom 23 some of the elements of the system include a wall unit 28, a mobile unit 32 operated by a student guard or control student 30*a*, and a master computer network 29 connected to wall unit 28 and through a port 4 to a tagging network depicted in FIG. 10. Wall unit 28 contains a base unit with system programs, power circuit and means for maintenance of drone's capacitor power. Wall unit 28 also contains, as explained below with respect to FIGS. 2 and 3, a battery/capacitor powered device which contains an internal capacitor high energy charge retention within each the base unit, and is internally stored on board to power each drone.

FIG. 1 also depicts classroom 23 being invaded by an armed terrorist 20. Both wall unit 28 and mobile unit 32, in this example, are depicted as serving as hangers and launch pads for very small drones 26 and 26'. These kamikaze (i.e. one way) drones 26 and 26' perform the preferred delivery of a medical knock-out and/or fatal dose of medication as required by the situation. They also, with obvious slight modification, could be used to etch a digital identification symbol into a target, or affix a very small RFID device. Here, drones 26 and 26' from both sources 28 and 32 are shown in action, having been launched after the required identification tagging has been performed from either wall unit 28 shown, or mobile unit 32 held by control student 30*a* or identified from a control unit (see FIG. 10).

Wall unit 28 is automated and self-sufficient in that it contains its own optics systems, programmed instructions and the laser power in an automated $CO_2$ laser to etch an identifying mark upon a visible target, such as terrorist 20. It also may act independently under its own program control, independent of a room controller person if necessary, and thereby to mark or even to take down terrorists using its own hardware and software. It also maintains its own fleet of small drones 26. In addition to wall unit 28, each mobile unit 32 has its own drone fleet. Each drone 26 or 26' has the capability of taking out a previously identified and marked terrorist.

As an alternative use, certain pre-selected drones may also be equipped with tagging or marking equipment for delivery to non-line of sight or remote locations. Thereby, coverage of each protected location would appear to be complete and quickly available. Additionally, each unit at each location would interconnect with each other united for cohesive preventative action and inter-communications.

Now, with specific reference to FIG. 1, a terrorist 20 with a gun 22 is shown entering a classroom 23 having students 30 and a supervising teacher 30*b*, and is:

(1) Positively identified as a dangerous intruder by a "live operator" by his/her actions, like having pulled out a gun or rifle, within seconds of such identification and immediately thereafter, is affixed with a unique identifying mark in a vulnerable spot 38. This process occurs by the operator of a mobile protective device 32 sighting and etching of a discrete identifying mark on a section of bare skin of terrorist 20 (preferable) or on clothing, said mark being etched by a laser (not shown in FIG. 1) located in the on-board, hand or arm mounted (thus mobile) device 32 operated by students or guards 30*a*; or alternatively by others such as policemen or school guards;

(2) Or, after a programmed decision of an "attack-in-process, is made by a more general alert or applying logic and data contained in the alternately available wall mounted unit 28 linked by communication to other units or other mobile units. Although only one wall unit 28 and one mobile unit 32 are depicted in FIG. 1, it is obvious that more than one of either or both units could be employed either in classroom 23 or at other control area; or (3) Is otherwise generally identified as an intruder in a more general alert, is otherwise marked as unique, by for example a RFID device or by and/or for example a more general alert, whether by wall unit 28 or an individual drone, operating in a benign marking model or the arm-mounted Mobile sighting units may be used to place the unique identifying mark upon the body of the previously (a second or two earlier) positively identified intruder/terrorist 20.

(4) Immediately, computerized logic determines that the intruder is hostile (or not) and after marked status is thereafter elevated to active hostile. This determination becomes the "GO" signal for an automated attack (see e.g. FIG. 9).

(5) the attack signal is activated, and a delivery of drones 26 and/or 26' having an incapacitating payload from a hanger in wall unit 28 or mobile unit 32 is instigated. Wall unit 28 is connected to an Attack Master Computer Network, indicated in box 29.

(6) The target, that is terrorist 20, having been previously identified as such a second or two earlier, is neutralized by a payload of a sedative, or stronger drug, carried in a harpoon 24 on drone 26 and travelling on a trajectory 27 from a hanger in wall unit hanger 28. Harpoon 34 is shown striking a vulnerable spot 38 on the tip of the left hand of the terrorist 20. There are multiple small sized drones that can be insect or mouse sized, all with a high power-to-weight ratio.

(7) Under pre-programmed control, with human intervention allowed but not essential to proceeding, an attack and implantation of an incapacitating payload is ordered by a master computer network 29 using a control signal. Alternatively, a signal (also programmable) shall not be ordered until the confirmed "verified identifying tag is etched or affixed." Then a pre-programmed control signal is instantly issued at the master control location (for this school or the particular location), thereby authorizing within a split-second the sedative strike by the on-site drones, whether from mounted wall unit 28 or from mobile unit 32 with a live guardian 30*a*.

(8) A launched drone will then seek, using standard search and destroy algorithms, the identifying marked target and deliver the payload automatically, again, merely incapacitating the intruder.

(9) Teacher 30*b* supervises a plurality of students 30. One student, a guardian or control student 30*a*, is equipped with an arm mounted mobile Control Box 32 that has a hanger 34 of secondary drones 26' therein. Control box 32 also has a rifle style sight 33 which could be used by control student 30*a* to aim a secondary drone. As shown in FIG. 1, control student 30*a* has released a secondary drone 26' and it is shown on a trajectory 36 which extends to terrorist 20. A target area on terrorist 20 is marked for example by etching using a CO2 Laser. Such target area includes a vulnerable location or spot 38 which includes a bare spot on the head of a terrorist 20 such as an ankle, a knee, a nose an ear and a cheek. Other possible locations on terrorist 20 that can be marked include socks or pants, and other ways of marking include tagging with an RFID on shirt, or pants.

Once the intruder is determined as hostile and is marked as hostile, an attack signal is activated, and a delivery of drones 26 is instigated. Drone 26 have an incapacitating payload and are retained in and released from a hanger in wall unit 28 mounted on a ceiling 39 or wall 40 (FIG. 2) in classroom 23 or a hanger 34 in mobile unit 32. Wall unit 28 is connected to an Attack Master Computer Network, indicated in box 29.

The Wall Unit 28

Also, with reference to FIGS. 2, 3 and 4, the fixed components of wall unit 28 are depicted. Each separate room 23 to be a subject of the protection system within a specific school or segment of an auditorium or stadium has a wall unit 28 fixedly mounted, for example, on a ceiling 39 or a wall 40 therein from which a full view of classroom 23 which has the best unimpeded visibility of the area to be observed. Wall unit 28 includes hangers which contain drones 26 in a box or housing. The housing in one embodiment can be approximately 38 inches in length by 18 inches wide and it is affixed to the ceiling 39 in classroom 23. Within the housing or affixed thereto are at least the following listed components.

A. An aimable red sighting laser 202;

B. An aimable $CO_2$ laser 204 with a barrel at 204*a* together with necessary optical and powering components as required to aim, fire and etch a symbol or code into target materials. The target materials may consist of human flesh, clothing, shoes or plastic materials.

C. An optics system 206 that includes a Fish-Eye Lens for Optic sightings automatic computer-controlled input for targeting optics, Wi Fi connections to all logic and firing components and central systems with controlled solenoid aimed output.

D1. A fixed location mirror 208*a* to direct laser output, to a targeting mirror movable in at least 180-degree directions, to cover any possible areas where a target is located in that room or location covered by the system. $CO_2$ laser 204 has a focusing system including a barrel 204*a* whose length will be facilitated by a longer box, such as 38" and as needed, protrusion into an existing adjacent wall so that more delicate components are located out of the reach of unauthorized persons into adjacent wall as needed for security.

D2. Aiming Mirror 208*b* may serve double duty too aim Red IR spot as well as to aim the next delivered hit from $CO_2$ laser 204.

E. Power components 210 such as batteries, capacitors, transformers, and wiring necessary to connect the components via motherboards or solenoids as required to aim and control sighting and high-power output from computers.

F. Interim online storage and long-term storage 212 of computer programs both informational and action controlling the mechanisms contained in the box.

G. Optical sighting elements 214 include lenses and mirrors as necessary to direct optical input as to the location and events to the computerized search and destroy components. Where focusing requires physical movement of mirrors, solenoids deliver necessary aiming and focusing physical adjustments.

H. A hanger having hanger bays 216*a* and 216*b* which are similar to the hanger described foregoing in the mobile unit except that this hanger will be equipped by several larger and heavier duty drones capable of longer flight and higher speeds as well as the normal short-range drones.

I. A pedestal ball joint mounted faceted mirror device 218 having the capability of delivery of a high-powered laser beam, or alternatively the low powered citing being to a specific location on the target. Solenoids spin the mirror as required to accurately target a spot on the target's body or clothing.

As shown in FIG. 4, the details of a sighting mirror or target delivery mount 214 are depicted which is located outside of housing of wall unit 28. A ball joint and socket, or solid-state equivalent mount, mounts the unit to the exterior of wall unit 28. The mounting, be it a box, side, or bottom mount is similar to conventional mountings of large screen televisions.

Each wall unit is a functional independent unit in the sense that although overall system control can be exercised with lockouts based on specific information, nevertheless the unit is self-powered and capable of functioning in its specific location and elsewhere utilizing its own self-contained power supply and components.

In the event there is a multiple target situation, a number of mobile units can be associated with one or more specific wall units for information exchange and control.

When an alert situation is received by wall unit 28 from a central control or from master computer network 29 or one of an authorized mobile unit, it powers up components and prepares for action in a very short period of time which can be less than 10 seconds. The wall unit 28 becomes active and goes into a search and destroy mode upon the receipt of a "target and control situation." Wall unit 28 has sufficient computer capacity to store instructions and optical tracking information as necessary to locate, identify and mark by etching, for example, a target. This capability resides in wall unit 28 itself and also in its hangers which house several drones of several different types, such as short and long range using heavier, larger, and faster engine systems in order to cover longer distances to a target.

Each wall unit 28 remains in real time communication with the entire system for this facility and other facilities, for example for nationwide, in order to convey and receive information on the overall status in the event of a large-scale attack. Each wall unit is in constant communication with each mobile unit assigned under its control. However also ideally mobile units could convey information to a wall unit for assistance in the event of unusual circumstances.

The Arm Held Unit 32

In FIGS. 5, 6 and 7 arm held or mobile control box unit 32 is diagrammatically shown as being mounted on the left forearm of control student 30*a* (FIG. 1). Control box 32 is comprised of a rectangular container or housing 150 which can be made by 3-D printing. Container 150 stores the power, computers, logic circuitry, and transformers for the system in section 151. Section 151 also is comprised of a hanger 152 for containing a plurality of drones 26. Six drones are schematically depicted, but more or less can be accommodated. A mag/lev catapult (schematically shown at 154) is used to launch drones 26 and make them air borne. The weight of control box 32 in a preferred embodiment is about a quarter to a half of a pound, its width is about 3 inches, and its length is about 9 inches.

In arm held unit 32, a sighting section 160 having a rifle type sight 162 used for sighting and updating of the coordinates are simpler than in wall unit 28 because control student 30*a* physically holds the hand-held unit and can point or sight the unit at its target in much the same way as a hunter sights a rifle, as shown in boxes 730 and 732, FIG. 10. The arm held unit 32 has the same components as the wall unit 28, but human optics (as in a rifle type sight) and automatic system controls can override the manual input to the final decision of sending the signal "firing" the laser marking "GO" signal to the laser (all subject to the system control and used for firing the drones.

As an option is using a $CO_2$ laser with a rifle type identification to etch an identifying mark on the terrorist. The marking could also be accomplished by a drone operated by robotic remote control.

As shown in FIG. 7, a red button 170 and a yellow button 172 are mounted on sighting section 160 and are used to indicate various conditions of the system, as described herein. A USB port 174 is located at the outside end of sighting section 160 so as to permit charging of high voltage capacitors and lithium ion batteries 176 contained in section 151.

Mobile Arm Held Unit Components

The components of the mobile arm held unit 32 (FIG. 1) include:
- A housing or container includes a hanger for unit 32's own set of drones;
- A Wi/Fi computer with remote connections:
- Local aiming features. i.e. human optics similar to a rifle sight;
- An override circuit;
- Memory and logic circuits (programmable in real time).
- A low voltage battery and high voltage storage capacitors to power lasers.
- A control device contains a small $CO_2$ or other type of a laser emitter (example-infrared), an optical lens system of the type conventionally used in cameras and a conventional fine-tuning locator.

The control device notes the completion of the etching, records details of the location on the target, and issues an audible acquiring identifier signal, with details of key data transmitted to the central locations. The control device then issues a sound or beeper to indicate the acquisition and marking of the target. Next, the operator, or the Control Device automatically, confirms the successful "etch" of the identifier and delivers a unique signal that affirms the good-to-launch condition (clear for attack) by the unique signal. Immediately upon completion of the confirmed "etched" signal, an OK light would "clear to launch" would light up. The control device then automatically shifts to the "launch" mode. An all clear signal is also emitted in one embodiment.

Operating System Description:
(1) Marking with individual identifier, Optional or Parallel Methodologies Description, Chapter I.
(2) Targeting an individual, Previously Tagged. and Untagged. Options, with Appropriate Action, Chapter 2.
(3) Payload-Options. Chapter 3.
(4) Delivery of Payload. Chapter 4.

Description, Marking

The visual identification of a terrorist can be made by one of several alternate "identification" methods. The "identification methods" are defined as a computer recorded decision within the security system definitions made by one or more means, defined as sufficient means. Who and how this decision is made is a key component of the system.

In the preferred embodiment, a central feature for tagging and marking is the laser sighting and etching mechanisms. Drones comprise the delivery mechanism for the knock-out punch, the payload. However, the drones could, in a pinch, deliver a RFID tag to a target, if line-of-sight etching by either a wall unit or a mobile unit were not feasible.

The obvious advantage of laser etching or burning of an ID, for later use as to targeting delivery of the knock-out punch, is the optical action occurs virtually instantly, with no intervening launching of drones, flying the distance to the target, etc. Further, where there is a line of sight identification of the target, merely dialing up the power of the laser unit to knock-out punch might totally incapacitate the intruder or kill him, if the urgency is such for this action, which of course supersedes the interrogation process.

The drones are self-propelled robotic devices that can deliver a tag to an intruder. However, that method of marking is slower, and less accurate than direct sighting, either by automatic focusing mechanisms, or even eyeball rifle type sighting available on the mobile units issued to guards, teachers, or even students.

The "marking" process, which enables all subsequent neutralization steps to occur as a matter of system definition, is a three-step process. These include:

Step 1. The physical marking of the terrorist which is to be distinguished from a disabling attack;

Step 2. The criteria for selecting and authorizing the marking of each terrorist selected for neutralization by the system; and Step 3. A second or two seconds elapsed time for verification of positive identification and marking completes the pre-defense phase of this system's protection.

The physical properties and propagation of the mobile $CO_2$ laser is conventional and includes a marking or cutting beam, and has a size and weight suitable for wrist mounting on a guard or child student follows[1]:

[1] The robustness of $CO_2$ system, its physical parameters and focal length are well known in the art.

The Mobile identifier by etching is contained in a box or mobile unit, preferably attachable to the arm of an operator. The box has exemplary dimensions of about 5 inches, by 1 inch by 4 inches. Each operator will be trained in the functioning of the mobile identifying unit contained in the mobile unit, which is both a manual and a laser targeting mechanism, and a powerful $CO_2$ laser or other laser marking mechanism whereby a unique mark can be etched on the target, in a particular place on the target.

Methodology

Mobile Identification; Targeting of Previously Tagged Persons and Targeting of Unidentified Persons Alternatively, beginning with the premise that somewhere in a human traffic choke-point all individuals have been tagged using an armband. RFID, or other optically unique marking, the transition from an innocent individual to a targeted terrorist is quite simple. The selected or control individual, who has identified as a terrorist by stored program information, or new information acquired by a central location, merely selects the target button on his/her control pad on the mobile unit after selecting the unique marking identifier affixed to that individual and then presses the Red Button-"TARGET".

Under program control, the centrally located program would change the status of the individual marking mechanism as already affixed to the body of the targeted individual from benign to active terrorist. Thenceforth, all observers and all remote sensing units spaced in convenient locations or strategical locations about the facility would be on instant alert to immobilize the terrorist forthwith.

For one or more individuals who has not or cannot be marked (e.g. have slipped through the system, or in situations where the pre-marking is deemed unwieldy, socially unacceptable, or for example in a Las Vegas type situation where the number of untagged individuals could be totally out of any reasonable ability to control, or in classrooms where as a matter of social acceptability tagging of students and visitors is unacceptable, (one of which may be church like locations) an alternate solution must be adopted and the mobile tagging and targeting methodology according to the present invention (as described herein) appears to be the most preferable and hence viable alternative.

In this situation this system discloses two alternate and complementary methodologies for affixing a tag with a unique "intruder" marking. These are as follows.
a. The Wall Mounted Unit described herein, containing optical surveillance and targeting mechanisms under program control whereby a $CO_2$ laser or other optical marking device would burn an intruder label such as a unique digital number, or alternatively using today's state-of-the-art optical marking into the clothing, or if necessary or convenient, the skin of the intruder. Simultaneously, a state-of-the-art search and destroy program would identify vulnerable parts of the intruder's anatomy for targeting. In the wall mounted unit preprogrammed with the up to the second information, drones would be released carrying a programmed mission directive to deliver a payload and insert it into the anatomy of the intruder at the most vulnerable little spot, or alternative spots meeting the priority control selected by the search and destroy program.
b. Alternatively, a student, guard, security officer, qualified teacher or other authorized individual would activate, upon giving his/her own alarm, or by receiving a generalized notification of "intruder alert" their mobile unit the mobile unit denoted "KAlpha". The mobile unit contains an optical sighting laser mechanism and a marking "etching" mechanism whereby under operator control and visual sighting (subject to computer enhancement) a vulnerable spot on the body, preferably bare skin, would be targeted and the digital identifying and targeting symbol affixed via near instant encoding by its onboard high-powered but short duration laser, e.g. $CO_2$ or similar type laser. Thereby, each intruder would be affixed with a symbol unique to him or herself and thereby subject to attack by one or more of the fleet of drones as they are released from each of the hanger locations where in the drones are stored. For example, each such arm mounted laser sighting device could contain its own hanger, with for example for drones, each armed with a different deterrent payload.

To accomplish these three steps, three beam mechanisms are contained in mobile unit 32 and each wall unit 28. These are:
1. A high powered, but low setting of a CO 2 laser, or other equivalent laser configuration, is used to:
   a. measure the exact distance and auto-focus of the etching laser from the laser to the exact spot aimed by the aiming mechanism (with or alternatively by a guard or one of mobile unit users), and then, using preprogramed parameters;
   b. select the particular specific laser to uses as an etching or marking beam;
   c. fire the selected beam at the spot to be etched in one or more multiple bursts (all expected to occur in less than one second-automatically under programed control).
2. the laser so selected is used to etch a unique mark upon or into the target at the exact spot aimed (again, for example, the ear). The marking/laser etch may be of a very simple nature, for example a series of dots. These can be repeated several times in a close cluster for redundancy to produce a unique marking, for example a series of the number "T-1," denoting this particular target. Redundancy in the marking, which occurs within milliseconds in laser sputter bursts, provides highly accurate distinction to individual targets.
3. Additionally, should the need arise as an extreme response, a high powered, high setting of a CO 2 laser, can be used to cause permanent injury to the intruder. The marking laser can be used with or in lieu of a drone, for example in the case of an intent to inflict an active fatal attack upon the terrorist.

Swarm Attack

The drones, as described herein below, are self-propelled robotic flying devices that can deliver a tag to an intruder as an option to laser marking, and the drones are the main delivery mechanism for the payload of a knock-out medication, or stronger medicine as required by the strategic situation.

In a preferred embodiment, the intruder having been marked by a sentry or student, the attack order is given by either, the central system or an individual Guardian. Launch of drones 26 then takes place. Drones 26 have both fore and aft harpoons 24, as shown in FIG. 20, and travel on a trajectory 27 from a hanger 28 mounted on a wall in the classroom. Alternatively, a wrist mounted mobile unit (large matchbox size, assigned to each Guardian member) contains sighting and marking mechanism, and houses 2-6 drones.

Payload Options.

These several versions of airframe design all incorporate the concept that each drone will be capable of carrying multiple, e.g. four, harpoons, or alternatively maglev accelerated injectors whereby a minute dose of knockout drops, chloral hydrate, or other stronger incapacitating venom or poison would be injected through the skin into the body of the intruder.

Obviously, a simple unconsciousness rendered instantly would solve the terrorist problem and allow the incapacitated intruder to be later questioned and subjected to the rule of law as the facts dictate. Therefore, the program control scheme must place under system control a priority order for activation of a particular payload, likely on a mission by mission basis. But it is considered important to note that the system has the capability and flexibility of delivery of whatever payload those in control of the system for each particular institution deem appropriate.

These considerations also must consider the possibility of multiple attacks by multiple drones on one individual with the undesirability of delivering multiple doses with, for example, fatal results.

Possible Options of Chemical Substances Include the Following.

1. Knockout drops, chloral hydrate or the equivalent.
2. American bee venom.
3. African bee venom.
4. Quick acting nerve toxin.
5. Quick acting snake venom.
6. Potassium or hydrogen cyanide.
7. Biological agents are generally considered too slow for the immediate incapacitation required by the circumstance.

NOTE: The dosages per payload weight in comparison to power to weight ratio are determined according to current procedures known by those skilled in this art.

Delivery of Payload

The present invention includes a computerized tagging mechanism whereby a threat, whether a single individual or a group of individuals, may be separated for threat-elimination from the general surrounding populace (RFIDs are but one example).

Several acceptable methods are available; any one or more of them if properly and immediately executed, is adaptable via computer programming to the particular users' preference. Therefore, before the identification and delivery system of neutralizing methodologies can be begun it all starts with the ability to identify a particular target, and within that target a particular area susceptible to attack.

A key to the present invention is a very accurate and immediate method for physically tagging with virtual 100% accuracy a mobile target, even to a particular location of the target on a human body. And next, once the identification is verified as correct, it also includes nearly immediate neutralization of the intruder. As discussed above and following, optical marking by laser appears to be quicker and more accurate, but with physical RFID delivered, tagging can be used as a back-up where optics is foreclosed by events or the location.

Effectiveness of Counter-Attack

The counter-attack is thereby initiated and completed nearly instantaneously, and all subject to very little human decision-making, but with human control. And, in the event of error, no one is killed. If the encounter is successful, what you have is a sleeping terrorist—ripe for interrogation when he/she wakes up.

The Wall Mounted Unit described above contains optical surveillance and targeting mechanisms under program control. A $CO_2$ laser or other optical marking device would burn an intruder label having a unique number (or alternatively today's state-of-the-art optical marking) into the clothing. If necessary or convenient, the skin of the intruder can be used to bear the label. Simultaneously, a state-of-the-art search and destroy program would identify vulnerable parts of the intruder's anatomy for targeting. In the wall mounted unit preprogrammed with the up to the second information drones would be released carrying a programmed mission directive to deliver a payload and insert it into the anatomy of the intruder at the most vulnerable little spot, or alternative spots meeting the priority control selected by the search and destroy program.

The Data Flow Charts in FIGS. 8-11 Schematically Represent the Flow of Information and Actions Taken With reference to FIG. 8, a schematic block diagram of the overview of the antiterrorist system of FIG. 1 is depicted. A data flow of the vertical column of blocks all at the same time is shown depending upon the horizontal position of the blocks, which to the right is at a later time and the data flow begins with the existing systems, then the different phases of the present invention.

Under the existing systems data flow, the present national body data base of information about potential and known terrorists, whether kept federally or state and local, is depicted in box 502. Under the national body 502 is shown a breakdown of certain real time information about a possible terrorist name in box 504 and box 506 for a personal description and a photograph. The national body 502 is shared with a local data base 506 on a real time basis. The information from local data base 506 is obtained as needed by each system of data control records (DCR) 508 which provides information about our client as shown in box 510 and a sub data base of each institution of our client, such as a particular school, as shown in box 512. Within each institution information is shared and produced by a wi-fi 514, providing real time information on relevant known terrorist as shown in box 516. This information is available in each location of the institution, such as a classroom in a school, as shown in box 518 and then to each person (e.g. a control student 306a) carrying a mobile unit, as shown in box 520.

The information available at box 512 is automatically provided or available to supervisory guards located in each school box 522 at a later time as shown by the location of box 522. This information of box 522 is shared with each location within the school, such as a class room, as shown in box 524 and with mobile guards located therein as shown in box 526. The available information is passed to elements in a continuation flow chart shown in FIG. 9 through a port labeled 2. But information gathered in each location, for example, a terrorist just pulled a gun, is immediately fed back into the entire system, thereby updating the local data base and thus the entire system.

The information available at box 524 is passed at a later time to wall units shown in box 528. The information is shown as being shared by the wall mounted and the hand-held or mobile units, shown by boxes 528 and 532. As from the mobile units held by guards in box 526, the information from box 532 is passed to elements in a continuation flow chart through port 2. Thus, the information from wall unit in box 528 is passed as real time data, shown in box 534, via a Wi/Fi source, box 536, to mobile units 32, such as those that could be worn by law enforcement personnel, indicated by box 538. This information is passed to elements in a continuation flow chart shown in FIG. 9 through port 2. The information of sub data base 534 is also shared with a National Data Base, at a later time as indicated by the position of box 540.

Port 2 indicates a flow of information about an attack event, such as a known terrorist enters a room of a school, a person is seen pulling a firearm such as a hand gun or is seen carrying a long gun, or some other overt event transmitted though port 2 to local data bases, as shown in box 602 (FIG. 9).

Box 530 of FIG. 8 represents the sighting optics and the use of the obtained data. This step determines the exact focal distance to the target and is immediately sent, following in terms of milliseconds, to the data storage of real time data shown in Box 534. The distance to the target is used by the laser etching lasers that are activated nearly simultaneously and focuses exactly, resulting in imprinting a computer unique recognizable computer-generated mark at the selected location on the target. The measurement function is done with a "shot" from a standard $CO_2$ laser operated by a transit circuit. Each wall unit and mobile unit has a separate sighting lens for this function.

Real time information shown in box 534 is also reciprocally shared with national data base 540 (same as Box 502). A "GO signal is generated in box 541 by supervisors of national data base 540 or by a mobile unit shown in box 538. The generation of a GO signal is then passed through port 2.

The feedback of data regarding an underway terrorist attack is delivered as shown by the arrows going in the left direction.

The progress of the events shown connected by the various ports 2, continues with FIG. 9. FIG. 9 depicts the events that occur during an attack. A time line is shown in the figure showing events in boxes arranged according to time occurrences depending upon the horizontal position of the blocks and begins with inputs through port 2 from FIG. 8.

An attack event begins in box 602 of FIG. 9 in which information from Port 2 is received about a terrorist who walks into a school class room or another supplementary target is identified. In the same time frame, the information is passed to box 604 which is a holder of a mobile unit or is of a wall unit. In box 606, the information is evaluated to determine if the situation is an anomaly or is a GO. If the situation is a GO, meaning targeting drones will mark the intruder, the system provides a signal "ALERT STATES" in box 608, and from there sets the "ON" state in box 610.

From the ON state in box 610, the information is provided a box 612 that is at a later time and in which the system checks the issuing of the GO signal because no action can be taken until the GO signal is given.

At a later time, the GO fire signal is given to box 614. There a positive alarm is given to an identified individual or group. The information about the positive alarm is sent to box 616 where the wall units and the mobile units are activated so that they are ready.

This information amounting to a "GO" for marking with a unique id identifier is passed to box 616 where the information is checked against programmed decision criteria applied, and the information is passed back into the data bases as shown in box 617. The etch is completed and verified and that result (successful marking) is sent back to central. Only after that programed check can a decision be made to go to launch drones to counter the attack. The status is set to red as shown in box 616. From the activation of the wall and mobile units by box 618, the marking drones are launched or released by Box 620 to fly to the targeted terrorist to deliver the payload. In this way the terrorist can be later identified by the markings. Note that Box 622 is shown at a later time.

From Box 620 the system communicates through a Port 3 for further actions. From Box 622, the system communicates through a Port 4 for further actions.

From port 3 entered by the system from box 620 of FIG. 9, the system enters into a drone attack flow chart of FIG. 11.

The first "notice" of an actual attack by a terrorist is when a reliable source (e.g. a verified wall unit notice considered "reliable,") determines the condition using a strict protocol that a "RED" T event is happening and is in progress. Alternatively, a mobile unit sounds a "RED T" alert. The system then becomes "armed" by that immediate "GO fire" command from the wall units and mobile units, and the drones go into a Tagging mode. As stated, the foregoing targeting has occurred upon the confirmation, and the release and flight of the drones occurs, as depicted in box 652. While in flight, in real time, the Wi/Fi system updates the target information, as indicated in box 654. As seen in Box 656, the identification tells the user to select the flight path to the target. This results in the updating of the information in the drone's computer, as shown in box 658. Finally, the drone reaches the area on the target and attacks the target with their harpoons, as depicted in box 660. The harpoons penetrate the targeted area (e.g. an exposed arm of the terrorist) and release a substance. Depending upon the function of the drones, the substance can be a marking ink, or a RIFD, on the one hand, or can be a disabling substance (e.g. a drugging substance). Once the drones have completed their function, their task is "done" as indicated in terminal box 662.

The result is a nearly immediate incapacity of the invader/target and that person could be taken to a hospital, etc.

The targeting and uploading of the real time information is depicted in FIG. 10. The system of FIG. 10 is entered through port 4 from box 622 as shown in FIG. 9 and from master computer network 29 in FIG. 1. The sighting information from wall unit 28 or the mobile unit 32 uses a red laser to sight and aim, as indicated in box 700. The sighting information from arm-held unit 32 uses a manual sighting unit 33 to sight and aim, as indicated in box 701 whereby the mobile unit is pointed at the target as shown in box 732. The sighting coordinates are obtained in box 730 and the information is accumulated in box 702. In addition, the sighting and aiming information is transmitted from box 702 by a WI/FI system of box 704 to the verification (called the "feedback") logic of box 706 in the system. The sighting information is then subject to correction in realignment box 708, the information sent to correct aim box 710 and new sighting box 712.

Once the fire command is given in box 714, the drones are released as indicated in box 28 (FIG. 1). In flight updating information is sent by Wi-Fi as indicated in box 716. The identification information tells the user to select flight path to target and is sent as updating information as indicated in box 718. The stored and updated information is processed by an on-board program in an on-board computer control. The drones are redirected in their flight path in real time as indicated in box 720. Finally, the drones attack and interdict the terrorist target as indicated by box 722. The successes of each drone attack are passed back in box 724 to a central control 724 as it occurs.

Design of the Drone

In the design of the drone the primary mission objective must be a quick delivery over an unknown distance with complete accuracy. Obviously, the drone's size being engineered to be in the mosquito to horse fly range does not have much space for computer storage and computer programs. Alternatively, a little larger drone in the range of a hummingbird can be used. Search and destroy computer programs are conventional and have reached great effectiveness in military missiles and the logic remains the same regardless of the size weight and power of the payload and mission being accomplished.

The use of 3-D printing solves the problem of power storage and similarly to the extent the airframe and engine support modules can be made to perform double duty by the storage of computer motherboard components and the transformers necessary to carry out the transportation and guidance control functions, but some storage would obviously be possible within the structural chassis of the attack vehicle utilizing new 3D printing technology.

On the other hand, virtually unlimited information and logic storage required by system control under rapidly changing situations is available in the home base of the computer system and in each remote location.

Alternatively, a single, specially designed integrated circuit with effectively independent computer controlled sub-units can be used to perform complex functions as part of the individual sub-units made to perform all of the functions, with a minimal of weight and minimal use of space, and a minimal use of power at the separate RF interconnected locations to perform the necessary duties for each such location:

1. Central State or Federal clearing house net;
2. Each user, i.e. Schoolhouse, Church. Stadium, etc.;
3. Each Wall mounted unit in a classroom or auditorium; and
4. Each of hundreds of mobile units.

The cost effectiveness would be great, since all computerized systems hardware is standardized, and the computer software is conventional, with local variations as needed.

Therefore, in the miniaturization of design of this system attention has been made to minimizing the onboard computer storage in favor of more complex instructions and signaling conducted by the remote launching units and the alternate classroom storage units which could contain the higher logic requirements.

Usage of the control box permits the operator to observe the target, key a broad targeting beam of infrared radiation upon the target and activate a fine-tuning locator. Automatic fine tuning utilizes a cross-hair indicator to locate a vulnerable part of the anatomy of the target, like a bare neck or ear or nose or hand or arm, which are ideal for targeting. A parallel "etching beam" can burn or otherwise mark the spot on the apparel or uniform of the target.

Next, the user, or alternatively automatically, the control device in either the wall mounted box or mobile Guardian device, launches, under fixed control parameters, one or more small Drones. If 2 to 10 drones were launched, there would be a small swarm of drones.

The Drone

Drone 26 is depicted in FIGS. 12 and 13. Drone 26 has a body 46 and airfoils 44 attached to body 46. Also shown are the gimbaled mounting of a single engine 62. Engine 62 is preferably a turbofan and is depicted in the position for straight ahead movement. Engine 62 under normal circumstances provides drone 26 an estimated speed of about 30 miles per hour.

This view also shows lifting surfaces and 360° double gimbal mounting mechanism for the "Turbo Can" which contains a magnetic repulsion and attraction propelled (mag/lev type) engine with accelerated turbine blades, all mounted on frictionless bearings. The main engine 62 is mounted on frictionless bearings and obtains power by maglev acceleration of turbine tips interacting with alternating current in casing. Casing/motor mounts and hull are comprised of a ceramic capacitor doing double duty as an electrical storage unit within its structural volume. The gimbaled mounting mechanism provides a 360° mounting of the main engine to the air frame. It depicts an injector segmented magnetic needle mechanism, a micro-catapult powered by a mag-lev circuit that functions or operates similar to that of an aircraft carrier catapult launch deck. It also shows the lifting surfaces and the 360° double gimbaled mounting mechanism for the turbo can that contains the maglev accelerated turbine blades all mounted on frictionless bearings.

Alternatively, a plunger utilizing the forward motion and weight of the drone could furnish the energy to insert a harpoon 50 and its the pay load of the drone into the previously identified target by impact.

Optical location is computer controlled during flight from fish-eye lens/cameras input 60. Input 60 is used for guidance informational and action logic, position location and accurate delivery of the harpoon 51 into the target.

The gimbaled mounting mechanism provides a 360° mounting of main engine 62 to the air frame. An injector segmented magnetic needle mechanism, a micro-catapult powered by a mag-lev circuit that functions or operates similar to that of an aircraft carrier catapult launch deck is depicted. Also shown are ailerons or lifting surfaces and the 360° double gimbaled mounting mechanism for the turbo can 76 that contains the maglev accelerated turbine blades all mounted on frictionless bearings.

As for both drones 26 in FIGS. 12 and 13, optical input ports 60 can view in all directions. This incoming in-flight data enables control of drones 26, in conjunction with self-guidance data stored on board drone 26 and in the remote units, a mobile unit 32 and wall unit 28, all linked together with guidance software to only self-guidance in flight of each drone. The optical lenses and ports are located at various points on the drone and are marked at apparently ideal locations as at 60.

Engine 62 includes a turbine shaft and blades which are built using 3-d technology to create a one-piece rotating shaft/spindle/blades mounted within on a frictionless bearing. The hub end of the blades 85 (FIG. 15A) have the same magnetic polarity as the spindle 82 (FIG. 15B (presumably) similar to the usual negative ground. The entire blade/hub combination is provided with its embedded electro/magnetic components as necessary to generate the necessary magnetic polarity at the local spot of the turbine blade as required to interact in a Mag Lev force accelerating the blade at the correct instant in the rotation cycle. The rotating turbine is affixed to the turbine/engine combination by fore and aft frictionless bearings 92. In turn, bearings 92 are mounted into "turbo can" 76, both fore and aft. Can 76 is attached to air frame through the innermost of the double gimbaled motor mounts.

Drone 26 has a carved-out hull or body 46 which is designed to create lift when drone 26 is in a vertical takeoff position. Body 46 has as an air frame and carries a forward harpoon 50. Air frame 46 has a hole 53 in the middle. Body 46 has an elongated solid donut shape and has two concentric gimbals holding the engine. Numeral 54 designates a vertical axis control gimbal and attitude bearing and numeral 55 designates the main engine mount horizontal gimbal. Gimbal 54 is mounted to body 46 with left and right engine mounts 56 and 58. A camera 60 is located at the tail end and another camera 60 is located at the front or bow end. A computer section in body 46 holds a computer, a battery, and a power storage capacitor. The primary electrical storage utilizes layered ceramics with metallic inserts. The primary capacitor storage is in gimbals 54 and 55.

Power is supplied by a current (i.e. a flow of electrons) from a capacitor/battery storage located in computer section through the structure into computer controls and transformers.

As shown in FIG. 14, main engine 62 of drone 26 is mounted with two gimbals 54 and 55 in a straight-ahead position. Main engine 52 is preferably a mag-lev electric engine using an alternating current. Such engines are commercially available. All gimbals are seated on frictionless bearings and are positioned by an installed computer. The bulk of the weight of drone 26 is in the bottom hull.

Takeoffs and landings are vertical and the design produces good stability. Hole 53 in the center of the deck permits air to flow freely, thereby permitting directional and elevational control, as is well known in order to be operational.

All electrical actions are Mag/Lev, generally using variable cycle A/C mounting 12 Volt system controls and computer functions.

It is important that drone 26 has an effective power to weight ratio. The on-board power storage is designed to be large enough such that it will result in the efficiency being a multiple of what might be expected in the absence of the drone chassis being double and triple used as storage capacity for electrical components, transformers, batteries, capacitors and wiring. The battery/capacitor, described below, provides sufficient peak power in a compact, lightweight structure.

With reference to FIG. 12, an engine 62 of drone 26 is depicted. The engine uses magnetic repulsion and it is scalable for use in a miniature size drone to use in aircraft that can carry people and machines to missiles. See also FIGS. 14, 15A and 15B. Thin wires made by 3D printing are used by the small drones for propulsion by delivering magnetically powered opposing fields of identical polarity contained within a circular orbit. The fields are shaped in the desired configuration, to drive the opposing element in a circular direction, thereby creating a torqueing motion of great power to weight ratio.

This result for small motors, which is scalable to very large motors with linear identical results, is because the proximity of the identically magnetically electromagnetic poles is very close. Dynamically, as the centrifugal force of the moving inner element presses outward, the fixed distance between the two like fields decreases, thereby creating a greater repulsion the faster the engine runs.

Similarly, such a configuration would be friction-less adding to the power and efficiency of operation. The configuration of the fields as built using 3D printing would follow the principles of Maxwell's equations as to field strength and shape as necessary to achieve the designed results, apparently regardless of scale.

The engines of the small drones would be constructed using well known principles, available by 3D printing technology for very small objects (the instant engines, rotors, etc.), which also depicts the dynamics of the magnetic interrelationship between the flow of electrical current as it is transferred to the turbine blade tips 86.

Main engine 62 is shown mounted on frictionless bearings and achieves power by maglev acceleration of turbine tips 86 interacting with alternating current in housing 76. Housing 76 is comprised of a ceramic capacitor doing double duty as an electrical storage unit within its structural volume. There is a requirement of a power to weight ratio that is reasonable so that the operative requirements of the mag/lev turbine which require a tuned cycle of current, either alternating or direct, can be met so that turbine blades 84 (tips 86 have the same polarity of the magnetic field) can be rotated.

The shaft and "HUB" of the cast turbine blades are magnetized polarized positive, the tips are magnetized negative. Windings on the electronic equivalent are nested into the turbine tips receiving field strength from current by induction creates the requisite polarity.

Referring to FIGS. 15A and B, main engine 62 is comprised of a housing 76 with an outer wall 78 of the air frame and an inner tube or liner 79. Main engine 62 is also comprised of a Turbofan 80 mounted on a spindle 82 of solid titanium and a plurality of blades 84 having a hub 85 affixed to spindle 82, each blade 84 also having its own blade tip 86. Turbine blades 84 are made by a 3-D printer and are positive+ at spindle 82 and negative − at blade tip 86. Spindle 82 has a shaft 88 that is charged with the same electromagnetic polarity as is its bearings, making the bearings frictionless. Spindle 82 maintains a constant high and low charged+ (or alternatively −) to effect the frictionless operation. The electric motor is designed to synchronize to the rotation of tips 86 of turbine blades 84. Also, blades 84 can be made with a 3-D printer to be alternating current electro magnets. A high voltage alternating current potential is applied by wiring 100 to housing of main engine 62.

The entire turbo/engine assembly is mounted as a double gimbal on frictionless bearings and has 360 degrees of programmable control. The rotating blades 84 of the mag/lev motor (in this example) is negative at hub 85 and positive at tips 86. It spins on two frictionless bearings 54 and 55 at the fore and aft ends. The entire spinning mechanism, with blades 84 is inside of the "thruster can" 78 and generates and delivers sufficient thrust in seconds to provide the payload with enough energy for its mission, and deliver within seconds. The primary quickly available power (capacitor) storage is in the gimbals with a battery/capacitor back-up in the airframe.

The dynamics of the turbo engine are as follows. At one end of housing 76 is an electromagnet 90 and at both ends are frictionless bearings 92. Each blade tip 86 is similarly a formula designed electro-magnet. When a charge is sent through each tip 86, in synchronization with its mag-lev dynamically physically close attractor or repeller (alternatively) the force is applied in optimal proximity thereby transmitting the force to the spinning blade. Thus, energy of motion is transferred into the blade, thereby causing the lateral spin of the blade tip or repeller (alternatively) of the spin to occur. Accordingly, turbine blade 84 serves as its own power provider. Again, the similar magnetic polarity in the bearings of each blade hub 85 (the same for spindle and blade hub) makes the entire assembly frictionless which should be jam free and very efficient. Microscopic electro-magnets and wiring are embedded into both the rotor blade tips 86 and the (like polarity) wall ceramic 78 used as the "can" enclosing the turbine blades. The blade hub 85 is preferably made of a metal and comprises the opposite magnetic polarity from the blade tips and the can.

In particular, a shaft end or "hub" of the cast turbine blades are mag polarized positive+, the tips are polarized negative (−). Windings or the electronic equivalent are printed onto the turbine tips receiving field strength from the current though induction to create the required polarity. Engine 52 (which can be an electric motor) is designed to synchronize to rotation of tips 86 of turbine blades 84. Engine 62 can be made by a 3-d printer to have alternating current electromagnets.

The circuit includes engine 62, a multi-transformer 96, a multi switch 98, and wiring 100 electrically connecting multi-transformer 96, and multi switches 98.

The dynamics of the motor/turbo are as follows. Alternating current flows back and forth in wiring 100 creating + or − magnetic polarity on the sides of housing 76. Turbine blade tips 86 are (for example), positive (+) at a first moment of time, and negative (−) at a second moment of time. Rotation of the turbofan 80 is in synch with the fluctuating mag field such that when a tip 86 of the Turbofan 80 reaches its maximum optimal approach during its spin to one of several "magnetic action point" constructed within the sidewall 78 of the turbofan 80 can be either positive (+) or negative (−) or alternating positive (+) attracted, and alternatively negative (−) repelled. Thus, the electrical field thereby imparts the desired force on the rotating turbine tips. The alternating electrical current is created under a computer program control to synch the entire dynamic system. That is, the computer program synchronizes the rotation of turbine blades to polarity of the MAG/LEV units located in the inner wall of the chassis 101. Blade tips 86 are always positive; the housing or casing or shell 76 is always negative; and the stationary "attractor or repeller points" fluctuate within the casing 76 of the "turbo can" as designed to optimize operation of the combine self-powered electric turbine engine.

The drone has capacitor storage devices that double as the chassis or shell of the mobile devices. They furnish strength and stability, with an expected high power to weight ratio. Thus, it is a strong mounting base for engine and movable aerodynamic surfaces and the delivery mechanism for the injector mechanism and the payload.

With reference to FIGS. 16, 17, 18, and 19 the components of chassis 101 are depicted. Their characteristics are as follows. Chassis 101 can be produced by 3-d printing using state-of-the-art materials such as a composite ceramic insulating substrate with titanium or other very strong material. The body of chassis 101 is made by the depositing of succeeding layers which are later fired into the finished product. Solder or stronger and lighter conductor is on outside of chassis 101. They could also be comprised of very thin, non-erosive material such as gold or silver or glass coating. This coating serves as a ground wire for all circuits (such as is done in automobile bodies).

Low voltage battery outlet terminals 112 have a voltage from 0.05 volts up to 24 volts. The transformer 110 has a variable voltage out and a fixed voltage input. The high voltage capacitor storage layers are either interleaved with battery layers or of a separated physical form with a very light very strong composite ceramic insulator. The charge and discharge circuitry have connections to the control computer circuits.

FIGS. 20 and 21 are an alternate schematic top plan view of engine 55 and mounting within a hole in an air frame or chassis 120 of a drone 26 having a single Mag/Lev rotary turbine 122.

Turbine 122 is mounted on two gimbals 124 and 126 allowing single engine control with airflow discharge in 360 degrees in all directions. There are 3-D printed circuits integral to the airframe which carry instructions to all components and are for power at the several levels needed for computer functions, propulsion, airframe control and payload delivery. Gimbals 124 and 126 carry circuits in turbine blades. Air frame 120 has two vertical stabilizers 128 and 130, and two horizontal stabilizers 132 and 134 which are computer controlled. The flat vertical double 360-degree gimbal airframe has an open design with the structural bulk of the airframe and gimbaled mounts allowing space for storage of batteries, capacitor and controls, integral to its structure.

FIGS. 20 and 21 also show two forward harpoons 136 and 138 and two rearward harpoons 140 and 142, because drone 26 can fly backwards.

Immediately after launch, during the time injector activation, the drone flies at high velocity toward the gross location of the target, fine tunes its aim toward the exact vulnerable target area, and dives kamikaze style, to hit the selected area of the target. A kinetic powered plunger utilizes the mass of the on-board battery upon impact to drive a plunger imparting a micro-dose of appropriate nerve anesthetic into the blood stream of the target, assumed to be an invader.

Summary

The drones are used for tagging or marking previously unmarked terrorist with individual identifiers, or for targeting an individual, previously tagged, and untagged, In order for the small drones to successfully tag or mark, the drones have to have a substantial velocity so that upon impact with the target, it can insert a needle. Also, the needle, instead of being stationary mounted in the drone, can be driven by a magnetic injector mechanism such as a miniature micro catapult powered by a mag-lev injector circuit as in an aircraft carrier catapult.

The drones have a lens system that can: rotate, zoom, and auto focus so as to deliver a detailed image transmitted by the control box to an operator enabling a discrete selection by the operator of a "target" delivery point.

A laser emitter contained in each mobile control box, and in each wall unit provides a beam that is sufficiently powerful to deliver a usable "etching tracking symbol on the target of, or example a number or other identifier. The laser has an operative distance of from about 50 feet to about 300 feet.

To begin the procedure, the operator pushes a button (labeled: OK TO FIRE) on the box to enable a targeting algorithm. Upon a signal from the operator that a FIRE button has been pushed, and further upon receiving a computerized authorization control, the attack drones are launched. The drones locate the target using well known search and destroy algorithms under preprogrammed control, attack the marked area and deliver the payload. The intruder is thereby neutralized.

Usage and Construction

Wires from airframe chassis containing computer and batteries connect airframe 120. Airframe to mechanical control components and electronic/magnetic components of the engine. The entire assembly is built with 3-d printing. Construction of structural members using layering of electrical components with ceramic insulators, reinforced with metals where needed, for example in stress points between the engine and motor mounts, permits interleaving structural members with layered high-structural strength with high-power and capacitor/battery back-up. Thereby multi-use construction uses high structural strength layers with sufficient internal volume to store and provide the level of energy as required to fire each Mag Lev Impulse (+ or −) to the appropriate engine blade tip.

The entire system functions at all times under full computer control. By the multi-uses of the structural components, the energy supply is parceled out to each component as needed each instant as needed to supply both power to the engine blades and control to Airframe Control Elements. Thereby each drone self-contains sufficient power and up to the instant information enabling each dron(es) to successfully conduct its individual or group search & destroy mission as directed by the protection parameters of the system. Redundancy in the computer control systems is provided by computer back-ups contained in both the wall units and on board each drone, to the extent space and weight allow.

As may be readily appreciated by those of skill in the art physical protection and antiterrorist systems, the present invention can be practiced other than as is specifically disclosed herein. Thus, while the invention has been described generally and with respect to certain preferred embodiments, it is to be understood that the foregoing and other modifications and variations may be made without departing from the scope or the spirit of the invention.

LISTING OF NUMBERED ELEMENTS IN SPECIFICATION AND DRAWINGS

FIG. 1
4 local Master Computer Network
20 terrorist
20a digital mark on knee $CO_2$ laser
22 gun
23 classroom
24 harpoon
26 DRONE
26' secondary drone
27 trajectory of drone 26 from wall unit
28 wall unit with a hanger containing drones and mounted on a wall
29 Attack Master Computer Network
30 students
30a control student
30b teacher
32 Mobile mounted on left arm of 30a, containing 26'
33 rifle style sight
34 hanger in control box 32
36 trajectory of drone 26'
38 vulnerable locations or spots on terrorist 20
202 Red sighting-Arrows aiming laser-Optical-In Wall Unit
204 $CO_2$ laser-Arrows from Mobile and/or Wall Unit to left knee
206 Optical input to Wi-Fi with Fish-eye lens
FIGS. 2, 3 & 4
39 ceiling of classroom 23 to which wall unit 28 can be attached
40 wall of classroom 23 to which wall unit 28 can be attached
202 Red sighting laser
204 $CO_2$ laser
204a Barrel
206 Optical input with Fish-eye lens
208a Fixed location mirror
208b Aiming mirror
210 Power unit with batteries, capacitors, transformers and wiring
212 Interim online storage and long term storage of computer programs
214 Optical sighting lenses and mirrors
216a Forward hanger for drones
216b Aft hanger for drones
218 Pedestal ball joint mounted faceted mirror device
FIGS. 5, 6 & 7
150 container or housing of wall unit
151 section containing power, circuitry and transformers
152 hanger
154 mag/lev catapult
158 end portion of 150
160 sighting section
162 rifle type sight
164 front portion of 162
166 rearward portion of 162
168 red laser infrared for sighting
170 red button
172 yellow button
174 USB port
176 lithium ion batteries and high voltage capacitors
178 abort button
180 Plot Yellow button & light
182 yellow activation button
FIG. 8
502 national body data base of terrorist info.
504 name of terrorist
505 description and photo
506 local database
508 data control APP and records
510 our client
512 each school, etc.
514 WI/FI each place
516 position real time Apps
518 each school location
520 each mobile unit [such as?]
522 guards
524 each room
526 guards mobile
528 wall units
530 optics
532 to mobile units
534 real time Data
536 Wi/Fi
538 to mobile units
541 GO signal
FIG. 9
602 box beginning attack
604 box holder of mobile or wall unit
606 box to determine if situation is a GO or an anomaly
608 box providing ALERT STATES
610 ON state box
612 box for checking GO signal
614 box receiving GO signal
616 box in which decision made to counter the attack
618 box activating wall and mobile units
620 box in which marking drones are launched
622 box marking terrorist with yellow or red
FIG. 10
700 Red laser sight and aiming
702 box for sighting function
704 WI/FI system box
706 feed block logic box
708 box for realigning
710 box of corrected aiming coordinates
712 new sight box
714 firing of drone box
716 in flight WI/FI updates to drones
718 identification tells user select flight path
720 board program redirects drones in real time
721 Send Attack Information to Central Control
722 attack and interdiction targets
730 sighting coordinates of hand-held target
732 pointing hand-held unit at target
FIG. 11
652 drones released
654 in flight WI/FI updates
656 identification tells User to select flight path
658 on board on drone program updated in real time 660 attack and immobilize all targets
662 done
FIGS. 12, 13, 14
44 airfoil
46 body
50 forward harpoon
53 hole in 46
54 vertical axis control gimbal and attitude bearing
55 main Engine mounting horizontal gimbal
56 left engine mount
58 right engine mount
60 optical ports and cameras with 360° view both forward and aft in tail
62 main engine (58)
64 horizontal gimbal (55)
65 spindle mount welded to can wall
66 gimbal
68 gimbal
70 gimbal
72 hole in hull
FIGS. 15A, B. C
76 can or housing of engine 62
78 outer wall
79 inner tube or liner
80 turbofan
82 spindle of titanium for mounting turbofan
84 blades affixed to 82
85 blade hub
86 blade tips
90 electromagnetic
92 frictionless bearings at each end of 82
94 (blank)
96 multi-transformer
98 multi switch
100 wiring
FIGS. 16, 17, 18, and 19
101 chassis for drone power supply
102 capacitor
104 high alternating voltage outlet terminal
106 high direct current voltage outlet terminal providing high voltage direct current
108 high voltage transformer
110 low voltage transformer
111 battery back-up
112 outlet terminals for direct current out and an alternating current out
113 two alternating current input terminals for positive and negative voltage
FIGS. 20 and 21
120 chassis or air frame control section to control a marking laser
122 rotary turbine
124 gimbal
126 gimbal
128 vertical stabilizer
130 vertical stabilizer
132 horizontal stabilizer
134 horizontal stabilizer
136 forward harpoon
138 forward harpoon
140 rearward harpoon
142 rearward harpoon
144 horizontal stabilizer

The invention claimed is:

1. A protection system for a space comprising:
a victim disabling system that applies a disabling effect on a designated target, the victim disabling system comprising:
A. a control box located in the space;
B. one or more drones contained in said control box, said drone including an engine, a power supply, an optic system and a computer, said drone also having a member that delivers a disabling product to the target of the drones;
C. an optical sighting system that delivers target location information to said one or more drones; and
D. one or more payloads having an on-board logic and computing capability, and options to tailor the operation thereof, the payloads including knockout or fatal medications, and electrical shock, and a high explosive charge, wherein the selection of the disabling product depends upon the needs of the one or more drones, wherein:
the options of the payload of each one or more drones can be tailored from minute to minute as needed, by said on-board logic and computing capability;
said options are the result of stored programs in each drone and throughout the entire protection system; and
said one or more drones having a structure that a large power to weight ratio and having a double use of structural components comprised of ceramic materials capable of storing large electrical charges, and
wherein said one or more drones comprises: a body having a bow and a stern; and a turbofan engine mounted to the body with a double gimbal mounting mechanism, the engine being a mag/lev engine that contains a magnetic repulson and attraction engine using turbine blades having tips and mounted on frictionless bearing and utilize the tips of the turbine blades to obtain the needed rotary motion of the turbine blades.

2. The protection system of claim 1, wherein said space includes at least a partially enclosed space having a wall and a ceiling, and
wherein the control box is mounted on said wall or said ceiling.

3. The protection system of claim 1, wherein said control box is mobile.

4. The protection system as claimed in claim 1 wherein said one or more drones, has a body hull comprised of a ceramic capacitor that provides an electrical storage unit; and said drone further includes a
harpoon located at both the bow and stern thereof.

5. The protection system as claimed in claim 4 wherein said one or both harpoons can be projected from said drone by a launching system; and
said one or both harpoons carry a substance injectable into a terrorist, or either an electrical charge, or an explosive charge.

* * * * *